US012762998B2

(12) United States Patent
Cha et al.

(10) Patent No.: US 12,762,998 B2
(45) Date of Patent: Oct. 13, 2026

(54) LIGHT EMITTING MODULE AND LIGHT EMITTING SYSTEM INCLUDING THE SAME

(71) Applicant: SEOUL VIOSYS CO., LTD., Ansan-si (KR)

(72) Inventors: Namgoo Cha, Ansan-si (KR); Hyoshik Choi, Ansan-si (KR)

(73) Assignee: SEOUL VIOSYS CO., LTD., Ansan-si (KR)

( * ) Notice: Subject to any disclaimer, the term of this patent is extended or adjusted under 35 U.S.C. 154(b) by 251 days.

(21) Appl. No.: 18/586,995

(22) Filed: Feb. 26, 2024

(65) Prior Publication Data

US 2024/0331619 A1 Oct. 3, 2024

Related U.S. Application Data

(60) Provisional application No. 63/455,639, filed on Mar. 30, 2023.

(51) Int. Cl.

| | |
|---|---|
| ***G09G 3/32*** | (2016.01) |
| ***B60Q 1/50*** | (2006.01) |
| ***B60Q 3/70*** | (2017.01) |
| ***G06Q 20/08*** | (2012.01) |
| ***H01L 25/075*** | (2006.01) |

(Continued)

(52) U.S. Cl.

CPC ............. *G09G 3/32* (2013.01); *B60Q 1/5035* (2022.05); *G06Q 20/08* (2013.01); *H05B 45/20* (2020.01); *H05B 47/155* (2020.01); *H10W 90/00* (2026.01); *B60Q 1/543* (2022.05); *B60Q 3/70* (2017.02); *G09G 2300/0452* (2013.01); *G09G 2320/0626* (2013.01); *G09G 2320/0666* (2013.01); *G09G 2380/10* (2013.01);

(Continued)

(58) Field of Classification Search

CPC .... G09G 3/32; G09G 2380/10; B60Q 1/5035; B60Q 1/543; G06Q 20/08; H05B 45/20; H05B 47/155; H10W 90/00; H01L 25/13; G09F 27/007; G09F 21/042; G09F 21/048; G09F 21/049

USPC .......................................................... 362/545

See application file for complete search history.

(56) References Cited

U.S. PATENT DOCUMENTS

| | | | | |
|---|---|---|---|---|
| 10,412,800 | B1 * | 9/2019 | Beattie .................. | H04L 67/125 |
| 2014/0338237 | A1 * | 11/2014 | Chu .......................... | G09F 9/33 40/452 |

(Continued)

FOREIGN PATENT DOCUMENTS

| | | | |
|---|---|---|---|
| JP | 2017/43244 | A | 3/2017 |
| KR | 10-2011-0016128 | A | 2/2011 |

(Continued)

OTHER PUBLICATIONS

International Search Report issued Jun. 25, 2024 in PCT/KR2024/002907 (with English Translation of Category of Cited Documents), 4 pages.

*Primary Examiner* — Thomas M Sember
(74) *Attorney, Agent, or Firm* — Oblon, McClelland, Maier & Neustadt, L.L.P.

(57) ABSTRACT

A light emitting system is disclosed. The light emitting system includes: a means whose location can change; and multiple light emitting modules disposed in each section of the means, wherein one or more of the multiple light (Continued)

emitting modules is selectively turned on by a user for purpose to be recognized from outside.

14 Claims, 16 Drawing Sheets

(51) Int. Cl.

| | |
|---|---|
| ***H01L 25/13*** | (2006.01) |
| ***H05B 45/20*** | (2020.01) |
| ***H05B 47/155*** | (2020.01) |
| ***H10H 20/81*** | (2025.01) |
| ***H10H 20/816*** | (2025.01) |
| ***H10H 20/82*** | (2025.01) |
| ***H10H 20/824*** | (2025.01) |
| ***H10W 90/00*** | (2026.01) |

(52) U.S. Cl.
CPC ........... *H10H 20/816* (2025.01); *H10H 20/82* (2025.01); *H10H 20/8215* (2025.01); *H10H 20/8242* (2025.01)

(56) References Cited

U.S. PATENT DOCUMENTS

| | | | | |
|---|---|---|---|---|
| 2015/0269621 | A1* | 9/2015 | Wilson | G06Q 10/0833 705/14.62 |
| 2020/0166937 | A1* | 5/2020 | Adoni | G09F 19/18 |
| 2023/0369552 | A1* | 11/2023 | Chong | H10H 20/857 |

FOREIGN PATENT DOCUMENTS

| | | | |
|---|---|---|---|
| KR | 10-1444022 | B1 | 10/2014 |
| KR | 10-1916369 | B1 | 11/2018 |
| KR | 10-2020-0121406 | A | 10/2020 |

* cited by examiner

LIGHT EMITTING MODULE AND LIGHT EMITTING SYSTEM INCLUDING THE SAME

CROSS REFERENCE TO RELATED APPLICATIONS

This application claims priority from and the benefit of U.S. Provisional Application No. 63/455,639 filed Mar. 30, 2023, each of which is incorporated by reference for all purposes as if fully set forth herein.

BACKGROUND

Field

Embodiments of the present invention relate to a light emitting module which implements colors and a light emitting system including the same.

Discussion of the Background

A light emitting diode (LED) is a device that emits light upon application of electric current. Such a light emitting diode is formed by growing epilayers on a substrate and includes an n-type semiconductor layer, a p-type semiconductor layer, and an active layer interposed therebetween. An n-type electrode pad is formed on the n-type semiconductor layer and a p-type electrode pad is formed on the p-type semiconductor layer, such that the light-emitting diode is driven by an external power source electrically connected thereto through the electrode pads. Here, current flows from the p-type electrode pad to the n-type electrode pad through the semiconductor layers.

In order to prevent optical loss due to the p-type electrode pad and to increase heat dissipation efficiency, flip chip LEDs are being used. Various electrode structures are being proposed to ensure uniform current distribution in large-area flip chip LEDs. For example, a reflective electrode is formed on the p-type semiconductor layer and extensions for current distribution are formed on an exposed surface of the n-type semiconductor layer by etching the p-type semiconductor layer and the active layer.

An LED display may be obtained by forming individually grown red (R), green (G), and blue (B) LED structures on a final substrate.

SUMMARY

Embodiments of the present invention relate to a light emitting module and a light emitting system including the same. The light emitting module according to the present invention is suitable for use as a light source in various devices.

In accordance with one aspect of the present invention, a light emitting system comprises: a means whose location can change; and multiple light emitting modules disposed in each section of the means, wherein one or more of the multiple light emitting modules is selectively turned on by a user for purpose to be recognized from outside.

In one embodiment, one of the multiple light emitting modules may be a first light emitting module, wherein the first light emitting module may comprise a light emitting device formed across the entire plane thereof.

In one embodiment, one of the multiple light emitting modules may be a first light emitting module, wherein the first light emitting module may be used in a display turned on during controlling to reduce speed of the first light emitting module-equipped means.

In one embodiment, one of the multiple light emitting modules may be a second light emitting module, wherein the second light emitting module may comprise a first light emitting device emitting red series light, a second light emitting device emitting green series light, and a third light emitting device emitting blue series light, and wherein the first to third light emitting devices may be individually controlled.

In one embodiment, the second light emitting module may be used when implementation of at least four colors is required.

In one embodiment, one of the multiple light emitting modules may be a third light emitting module, and wherein the third light emitting module may comprise a first light emitting device emitting red series light, a second light emitting device emitting yellow series light, and a third light emitting device emitting cyan series light.

In one embodiment, one of the multiple light emitting modules may be a third light emitting module, and wherein the third light emitting module may be used for the purpose of displaying information about the form of energy that changes the location of the means outwardly.

In one embodiment, one of the multiple light emitting modules may be a fourth light emitting module, and wherein the fourth light emitting module may comprise first to third light emitting devices emitting red series light.

In one embodiment, the fourth light emitting module may be adjustable in red brightness.

In one embodiment, the light emitting system may be applied to a signal displayed outwardly during supply of electric energy to the means.

In one embodiment, the light emitting system may be configured to implement a string of characters.

In one embodiment, the light emitting system may be configured to be implemented via a subscription service.

In one embodiment, the subscription service may be applied to at least one of an internal display and an external display of the means.

In one embodiment, the subscription service may comprise the steps of: 1) selecting, by a user, an option via an intermediary; 2) paying, by the user, charge for the selected option; and 3) providing, by a service supplier, a corresponding service through operation of the multiple light emitting modules.

In one embodiment, at least one of the multiple light emitting modules may comprise a light emitting device comprising: a substrate; a first window layer supplying electrons; a second window layer supplying positive holes; an active layer disposed between the first window layer and the second window layer; a first ohmic electrode electrically connected to the first window layer; and a second ohmic electrode electrically connected to the second window layer, wherein the first window layer may comprise a first high-level doped layer applied relatively high doping level compared to other parts, and wherein the first ohmic electrode may be electrically connected to the first high-level doped layer.

According to the present invention, it is possible to texture a lower surface of the first window layer, thereby improving luminous efficacy of the light emitting device.

According to the present invention, even a red series light emitting device is identical to light emitting devices emitting other colors of light in terms of the orientation of a mesa, making it convenient to construct a circuit.

According to one embodiment of the present invention, the light emitting device is formed across the entire plane of the light emitting module, which is useful in cases where a single-color high-brightness light source is required.

According to the present invention, different types of light emitting modules can be freely selected and arranged as desired by a user.

BRIEF DESCRIPTION OF THE DRAWINGS

The above and other aspects, features, and advantages of the present invention will become apparent from the detailed description of the following embodiments in conjunction with the accompanying drawings.

DETAILED DESCRIPTION OF EMBODIMENTS

Figure 1:
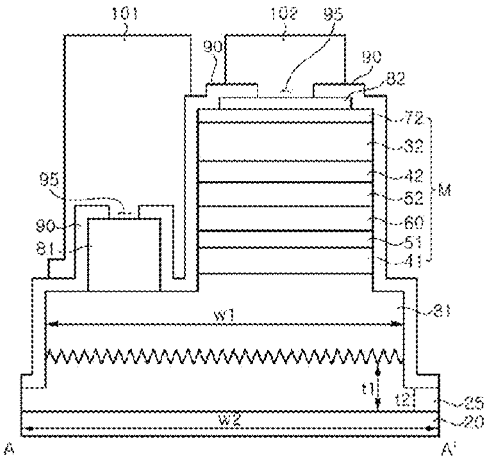
FIG. 1 is a schematic sectional view of a light emitting device according to a first embodiment of the present invention.

In the following description, for the purposes of explanation, numerous specific details are set forth in order to provide thorough understanding of various exemplary embodiments or implementations of the present disclosure. As used herein, "embodiments" and "implementations" are interchangeable terms for non-limiting examples of devices or methods employing one or more of the inventive concepts disclosed herein. It will be apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects (hereinafter individually or collectively referred to as "elements") of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, and property of the elements, unless specified. Further, in the accompanying drawings, the size and relative sizes of elements may be exaggerated for clarity and/or descriptive purposes. When an exemplary embodiment is implemented differently, a specific process order may be performed differently from the described order. For example, two consecutively described processes may be performed substantially at the same time or performed in an order opposite the described order. In addition, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, or Z" and "at least one selected from the group consisting of X, Y, or Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," or the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (for example, as in "sidewall"), or the like, may be used herein for descriptive purposes, and, thereby, to describe one element's relationship to other element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (for example, rotated 90 degrees or at other orientations), and, as such, the spatially relative descriptors used herein may likewise interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, or the like, which may be formed using semiconductor-based fabrication techniques or other manufacturing technologies. In the case of the blocks, units, and/or modules being implemented by microprocessors or other similar hardware, they may be programmed and controlled using software (for example, microcode) to perform various functions discussed herein and may optionally be driven by firmware and/or software. It is also contemplated that each block, unit, and/or module may be implemented by dedicated hardware, or as a combination of dedicated hardware to perform some functions and a processor (for example, one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure pertains. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the present invention will be described in detail with reference to the accompanying drawings.

FIG. 1 is a schematic sectional view of a light emitting device according to a first embodiment of the present invention.

Referring to FIG. 1, the light emitting device according to this embodiment includes a first light-transmissive layer 20, a first window layer 31 disposed on the first light-transmissive layer 20, an active layer 60 disposed on the first window layer 31, a second window layer 32 disposed on the active layer 60, a second ohmic electrode 82 disposed on the second window layer 32, and a first ohmic electrode 81 disposed on the first window layer 31.

In addition, the light emitting device according to the first embodiment may further include at least one selected from among: a second light-transmissive layer 25 disposed between the first light-transmissive layer 20 and the first window layer 31; a first cladding layer 41 and a first electron control layer 51 disposed between the first window layer 31 and the active layer 60; a first positive hole control layer 52 and a second cladding layer 42 disposed between the active layer 60 and the second window layer 32; a second contact layer 72 disposed between the second window layer 32 and the second ohmic electrode 82; an insulating layer 90 covering an exposed surface of the light emitting device; a first bump 101 disposed on the first ohmic electrode 81; and a second bump 102 disposed on the second ohmic electrode 82.

Figure 2:
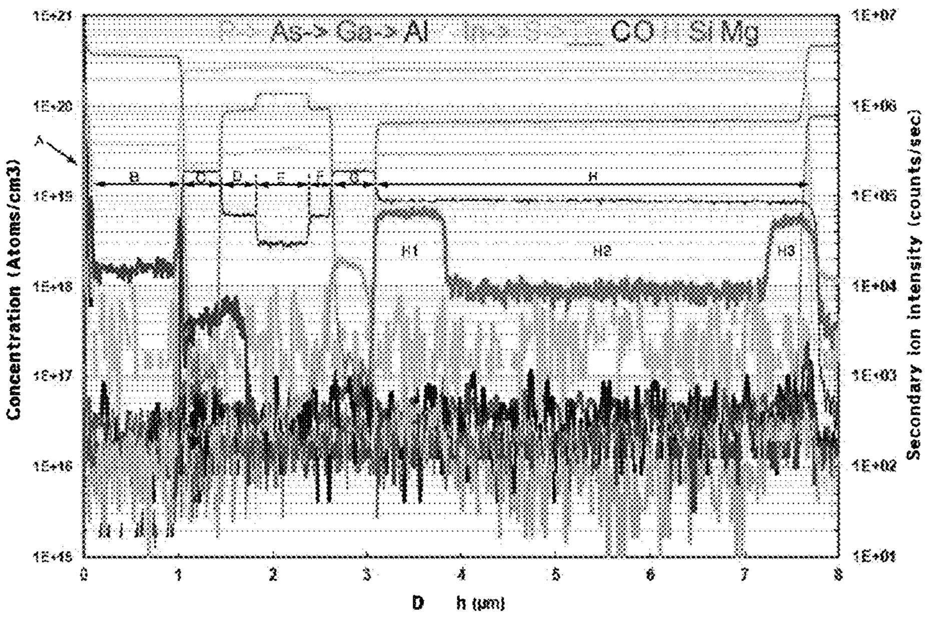
FIG. 2 is a graph showing the composition of each layer of the light emitting device according to the first embodiment while etching the light emitting device layer by layer.

FIG. 2 is a graphical representation of the composition of each layer of the light emitting device according to the first embodiment, wherein the light emitting device includes the first window layer 31, the first cladding layer 41, the first electron control layer 51, the active layer 60, the first positive hole control layer 52, the second cladding layer 42, the second window layer 32, and the second contact layer 72. Sections A to H shown in FIG. 2 are approximate for illustrative purposes and do not necessarily depict the boundary of each layer.

In FIG. 2, section A (where the black (Mg) and yellow (H) graphs have peaks thereof) corresponds to the second contact layer 72, section B corresponds to the second window layer 32, section C corresponds to the second cladding layer 42, section D corresponds to the first positive hole control layer 52, section E corresponds to the active layer 60, section F corresponds to the first electron control layer 51, section G corresponds to the first cladding layer 41, and section H corresponds to the first window layer 31.

Now, the light emitting device according to the present invention will be described in detail with reference to FIG. 1 and FIG. 2.

The first light-transmissive layer 20 transmits light emitted from the active layer 60, and may be formed of a light-transmissive insulating material. As used herein, the term "light-transmissive" may mean not only that a corresponding layer is transparent, that is, transmits all wavelengths of light, but also that a corresponding layer is translucent or partially transparent, that is, transmits only a predetermined wavelength of light or only a portion of the predetermined wavelength of light. The same applies hereinafter.

The first light-transmissive layer 20 may be a substrate, for example, any one selected from among a sapphire substrate, a silicon substrate, and a gallium nitride substrate.

The first window layer 31 serves to generate and supply electrons. As a dopant for the first window layer 31, Si or Te may be used.

The first window layer 31 of the light emitting device according to the first embodiment may include a first high-level doped layer. The first high-level doped layer has a higher dopant concentration than the other portions of the first window layer 31, and is exposed during a mesa M etching process to be electrically connected to the first ohmic electrode 81. Hereinafter, a portion of the first window layer 31 having a lower dopant concentration than the first high-level doped layer will be referred to as a "low-level doped layer". In FIG. 2, section H1 corresponds to the first high-level doped layer and section H2 corresponds to the low-level doped layer.

Since the first window layer 31 includes the first high-level doped layer, it is desirable that the first window layer 31 be thicker than a window layer of a typical light emitting diode. For example, the first window layer 31 may account for 50% or more of the total thickness of the semiconductor layers of the light emitting device. In addition, the first window layer 31 may account for 80% or more of the thickness of a portion below the active layer 60 (for example, a portion including the first electron control layer 51, the first cladding layer 41, the first window layer 31, the second light-transmissive layer 25, and the first light-transmissive layer 20 in FIG. 1; the same applies hereinafter). For example, the light emitting device may have an overall thickness of 4,500 nm to 7,600 nm, preferably 6,500 nm to 7,600 nm. The portion below the active layer 60 may have a thickness of 3,000 nm to 5,200 nm, and the first window layer 31 may have a thickness of 3,000 nm to 5,000 nm.

If the first window layer 31 lacks the first high-level doped layer, this results in poor ohmic contact between the first window layer 31 and the first ohmic electrode 81. Since forming the first high-level doped layer in the first window layer 31 and bringing the first high-level doped layer into contact with the first ohmic electrode 81 allows good ohmic contact between the first window layer 31 and the first ohmic electrode 81, a mesa may be formed such that an exposed surface of the first window layer 31 for electrical bonding to the first ohmic electrode 81 faces the second window layer 32. Accordingly, the first ohmic electrode 81 and the second ohmic electrode 82 can be oriented to face in the same direction, thereby facilitating electrical connection between the light emitting device and a circuit.

If the first high-level doped layer is excessively thick or has an excessively high dopant concentration, the amount of electrons supplied increases and the leakage of electrons increases, whereas, if the first high-level doped layer is excessively thin or has an excessively low dopant concentration, this results in poor ohmic contact between the first window layer 31 and the first ohmic electrode 81. Accordingly, the present inventors optimized the dopant concentration and thickness of the first high-level doped layer through many experiments.

The thickness of the first high-level doped layer may be about 3% to less than 30% of the thickness of the first window layer 31, may be about 5% to less than 30% of the thickness of the portion below the active layer 60, and may be about 30% or less, preferably about 6% to less than 20% of the overall thickness of the light emitting device. For example, when the overall thickness of the light emitting device is 7,600 nm, the thickness of the portion below the active layer 60 is 5,200 nm, and the thickness of the first window layer 31 is 4,500 nm, the first high-level doped layer may have a thickness of 300 nm to 900 nm, preferably 400 nm to 600 nm.

In addition, the dopant concentration of the first high-level doped layer may be 10 times or less, preferably 5 to 10 times, that of the low-level doped layer. For example, the average dopant concentration of the low-level doped layer may be about 1e17 to 3e18 (the exponential notation is used below.) atoms/cm$^3$, and the dopant concentration of the first high-level doped layer may be 4e18 atoms/cm$^3$ or more. This relationship in dopant concentration between the first high-level doped layer and the low-level doped layer allows the light emitting device to maintain stable electrical properties.

The numerical values described above are results of optimization at the present level of technology, and it will be possible to optimize the present invention more advantageously as technology advances. For example, given the present level of technology, it may be difficult to form a first high-level doped layer with a thickness of less than 300 nm when the first window layer 31 is 4,500 nm thick, but with advancement of technology, it may be possible to form a first high-level doped layer with a thickness of less than 300 nm. The examples set forth herein are not intended to exclude this possibility.

The first window layer 31 of the light emitting device according to the first embodiment may include a second high-level doped layer on a lower surface thereof (a surface opposite the first high-level doped layer; the same applies hereinafter), wherein the second high-level doped layer has a higher dopant concentration than the low-level doped layer.

The second high-level doped layer is a section that does not appear in a final product when the lower surface of the first window layer 31 is subjected to a texturing process, and enables the first window layer 31 to be well textured due to a high dopant concentration thereof. In addition, upon bonding the first light-transmissive layer 20 to the semiconductor layer stack after removal of a growth substrate, the second high-level doped layer enables effective interfacial bonding between the semiconductor layer stack and the first light-transmissive layer 20 due to impurities therein. Further, even when a bonding material is disposed between the semiconductor layer stack and the first light-transmissive layer 20, the second high-level doped layer enables effective interfacial bonding therebetween.

The present invention includes both an embodiment in which the first window layer 31 is textured on the lower surface thereof and does not include the second high-level doped layer in the final phase thereof, and an embodiment in which the first window layer 31 is not textured and includes the second high-level doped layer in the final phase thereof.

The second high-level doped layer may have a dopant concentration almost equal to or slightly lower than that of the first high-level doped layer. In FIG. 2, section H3 corresponds to the second high-level doped layer.

The active layer 60 may be a multiple quantum well (MQW) structure formed by repeatedly alternating a quantum well (QW) layer and a quantum barrier (QB) layer, wherein electrons and positive holes meet each other in the quantum well layer to emit light. The active layer 60 may have a thickness of 550 nm to 650 nm.

The quantum well layer and the quantum barrier layer have different energy band gaps. The quantum well layer may be formed of either AlInGaP or InGaP, and may have a thickness of 3 nm to 7 nm. The quantum barrier layer may be formed of $In_xGa_yAl_zP$. In the relationship between y and z, y+z may satisfy $x*0.8 \le y+z \le x*1.2$. Alternatively, y+z may satisfy x+y+2=1. In addition, z may satisfy $0.15 \le z \le 0.4$. The quantum barrier layer may be formed by growing a main InAlGaP layer containing about 50% to 90% of Al after growing an InAlGaP containing about 40% of Al as a capping layer, after growing an InGaP layer as a quantum well layer additionally.

Preferably, the quantum well layer has a thickness of about 5 nm or less and the quantum barrier layer has a thickness of 15 nm or less. When the active layer 60 has a thickness of 550 nm to 650 nm, the number of quantum well layer-quantum barrier layer pairs may be 10 or greater, preferably about 20 to 40, more preferably about 40.

The second window layer 32 serves to generate and supply positive holes. The second window layer 32 may be a GaP layer, and may use Mg, C, or a combination thereof as a dopant therefor. An average dopant concentration of the second window layer 32 may be about 1e18 atoms/$cm^3$. The second window layer 32 may have a thickness of 500 nm to 10,000 nm, preferably about 1,000 nm.

The growth temperature of the second window layer 32 may be about 500° C. to 750° C. In order to ensure the quality of the second window layer 32, it is desirable that the second window layer 32 be grown at a temperature at least 20° C. higher than the growth temperature of the active layer 60. For example, the growth temperature of the active layer 60 may be about 680° C. and the growth temperature of the second window layer 32 may be about 700° C.

The second ohmic electrode 82 is electrically connected to the second window layer 32 to form an ohmic contact with the second window layer 32, and may be formed of a metal. Although the second ohmic electrode 82 may directly contact the second window layer 32 to form an ohmic contact with the second window layer 32, a second contact layer 72 may be formed on an upper surface of the second window layer 32 to contact the second ohmic electrode 82 to form an ohmic contact with the second window layer 32. The second ohmic electrode 82 may be a light-reflective material or a light-transmissive material. The light-reflective material may be at least one selected from among materials having a property of reflecting at least some wavelengths of light, such as Ge, Al, Cu, Ag, Au, Ni, Cr, Ti, Pt, Rd, Ru, W, Mo, and TiW, and the light-transmissive material may be at least one selected from among materials having a property of transmitting to at least some wavelengths of light, such as ITO and ZnO.

The second contact layer 72 may be disposed between the second ohmic electrode 82 and the second window layer 32 to form a good ohmic contact with the second ohmic electrode 82, and has a higher dopant concentration than the second window layer 32. For example, when the average dopant concentration of the second window layer 32 is about 1e18 atoms/$cm^3$, the average dopant concentration of the second contact layer 72 may be about 1e19 atoms/$cm^3$ or more. The growth temperature of the second contact layer 72 may be about 600° C. or more, and the second contact layer 72 may be a GaP layer. If the second contact layer 72 having such a high dopant concentration is excessively thick, an increased amount of dopants therein can cause formation of defects inside the semiconductor layer stack, which causes unwanted light absorption and thus reduction in luminous efficacy of the light emitting device. Accordingly, it is desirable that the second contact layer 72 have a thickness of less than 100 nm.

The first ohmic electrode 81 is electrically connected to the first window layer 31 to form an ohmic contact with the first window layer 31, and may be formed of a metal. The first ohmic electrode 81 contacts the high-level doped layer of the first window layer 31 to form the ohmic contact. The first ohmic electrode 81 may be a light-reflective material or a light-transmissive material. The light-reflective material may be at least one selected from among materials having a property of reflecting at least some wavelengths of light, such as Ge, Al, Cu, Ag, Au, Ni, Cr, Ti, Pt, Rd, Ru, W, Mo, and TiW, and the light-transmissive material may be at least one selected from among materials having a property of transmitting at least some wavelengths of light, such as ITO and ZnO.

The second light-transmissive layer 25 is formed between the first light-transmissive layer 20 and the first window layer 31 to transmit light emitted from the active layer 60, and may be formed of a light-transmissive insulating material. The second light-transmissive layer 25 may serve as a bonding layer to bond the first window layer 31 to the first light-transmissive layer 20, and may be any material having light-transmissive properties, such as silicon, polyimide, polypropylene, benzocyclobutene (BCB), and silicon dioxide. The second light-transmissive layer 25 may have a different index of refraction than the first window layer 31 and the first light-transmissive layer 20 to form an interface having a different index of refraction than the first window layer 31 and the first light-transmissive layer 20, thereby allowing effective light refraction and thus improving light extraction.

The first cladding layer 41 is formed between the first window layer 31 and the active layer 60 to act as a barrier layer preventing positive holes from crossing over into the first window layer 31, and has a relatively high energy bandgap for this purpose.

As a dopant for the first cladding layer 41, a dopant belonging to a different group in the periodic table than that for the first window layer 31 may be used, and the dopant for the first cladding layer 41 may have a larger atomic size than that for the first window layer 31.

As the dopant for the first cladding layer 41, Si, B, P, As, Sb, or Te may be used. Since Te has a larger atomic size than Si, using Te as the dopant, as compared to using Si as the dopant, has the advantages of obtaining high breakdown voltage (VR) and good photometric properties and ensuring better formation of an n-type layer with a smaller concentration.

The first cladding layer 41 may be an n-$In_xAl_{(1-x)}P$ layer, where x may satisfy 0.4≤x≤0.6. The first cladding layer 41 may have a thickness of about 300 nm to about 450 nm and an average dopant concentration of about 5e17 to 1e18 atoms/$cm^3$.

The first electron control layer 51 is formed between the first window layer 31 and the active layer 60 and serves to slow down the rate at which electrons reach the active layer 60. When the light emitting device according to this embodiment includes both the first cladding layer 41 and the first electron control layer 51, the first electron control layer 51 is formed on an upper surface of the first cladding layer 41 (that is, to be closer to the active layer 60 than to the window layer 31). By adjusting the thickness of the first electron control layer 51, the rate at which electrons reach the active layer 60 can be controlled. The first electron control layer 51 may be an $In_xGa_yAl_zP$ layer. In the relationship between y and z, y+z may satisfy x*0.8≤y+z≤x*1.2. Alternatively, y+z may satisfy x+y+z=1. In addition, z may satisfy 0.15≤z≤0.4. Within this range of Al content, it is possible to prevent light from the light emitting device from being absorbed by the first electron control layer 51, thereby improving light extraction. The first electron control layer 51 may have a lower dopant concentration than the first cladding layer 41, or may be free from dopants.

Elements forming the first window layer 31 may be the same as those forming the first electron control layer 51, and the first cladding layer 41 may have the same composition as the first window layer 31 except that the first cladding layer 41 lacks one of the elements forming the first window layer 31.

For example, the first window layer 31 may be composed of four elements, wherein three of the four elements may be group III elements (B, Al, Ga, In, Tl, Nh, etc.; the same applies hereinafter) and the other may be an element having a standard atomic weight of 30 or more. The first cladding layer 41 may be composed of three elements, wherein two of the three elements may be group III elements and the other may be an element having a standard atomic weight of 30 or more.

In addition, the two group III elements of the first cladding layer 41 may be an element having the highest atomic weight and an element having the lowest atomic weight among the three group III elements of the first window layer 31, and the element having a standard atomic weight of 30 or more in the first cladding layer 41 may be identical to the element having a standard atomic weight of 30 or more in the first window layer 31.

For example, each of the first window layer 31 and the first electron control layer 51 may be an $In_xGa_yAl_zP$ layer, and the first cladding layer 41 may be an n-$In_xAl_{(1-x)}P$ layer.

The first positive hole control layer 52 is formed between the active layer 60 and the second window layer 32 and serves to slow down the rate at which positive holes reach the active layer 60. The rate at which positive holes reach the active layer 60 may be controlled by adjusting the thickness of the first positive hole control layer 52. The first positive hole control layer 52 may include the same group III and V elements as the first electron control layer 51, and may be an $In_xGa_yAl_zP$ layer. In the relationship between y and z, y+z may satisfy x*0.8≤y+z≤x*1.2. Alternatively, y+z may satisfy x+y+2=1. In addition, z may satisfy 0.15≤z≤0.4. The first positive hole control layer 52 may have a lower dopant concentration than the second cladding layer 42, or may be free from dopants.

The second cladding layer 42 is formed between the active layer 60 and the second window layer 32 to serve as a barrier layer preventing electrons from crossing over into the second window layer 32, and has a relatively high energy bandgap for this purpose.

The second cladding layer 42 may have a thickness of 500 nm or less, preferably about 300 nm to about 500 nm. The second cladding layer 42 may have an average dopant concentration of about 8e17 to 1e18 atoms/$cm^3$, and, Mg, C, or a combination thereof may be used as a dopant for the second cladding layer 42. The second cladding layer 42 may be a p-$In_xAl_{(1-x)}P$ layer, wherein x may satisfy 0.4≤x≤0.6. The second cladding layer 42 may be formed of two group III elements, and may have a higher bandgap energy than the layers disposed on the upper and lower surfaces of the second cladding layer 42. Alternatively, the second cladding layer 42 may have the highest bandgap energy among the semiconductor layers constituting the light emitting device.

When the light emitting device according to this embodiment includes both the first positive hole control layer 52 and the second cladding layer 42, the first positive hole control layer 52 is formed on a lower surface of the second cladding layer 42 (that is, closer to the active layer 60 than to the second window layer 32). In order to protect the active layer 60 from interdiffusion that occurs during doping of the second cladding layer 42, the first positive hole control layer 52 is preferably formed thicker than the first electron control layer 51. For example, when the thickness of the first electron control layer 51 is in the range of about 150 nm to 350 nm, the thickness of the first positive hole control layer 52 may be in the range of about 300 nm to 500 nm. Alternatively, the thickness of the first positive hole control layer 52 may be one to two times the thickness of the first electron control layer 51. In this way, migration rates of electrons and positive holes can be balanced against each other.

The light emitting device according to this embodiment may further include a light guide layer formed between the second window layer 32 and the active layer 60 and/or between the active layer 60 and the first window layer 32.

When the light emitting device according to this embodiment includes the second cladding layer 42, the first positive hole control layer 52, the first electron control layer 51, and the first cladding layer 41, the light guide layer may be formed between the second window layer 32 and the second cladding layer 42 and/or between the first cladding layer 41 and the first window layer 31.

The light guide layer serves to increase luminous efficacy of the light emitting device by increasing reflectivity to light emitted from the active layer 60, and may be an $In_aAl_{(1-a)}P$ layer or an $In_xGa_yAl_zP$ layer. Here, a may satisfy 0.4≤a≤0.6 and, in the relationship between y and z, y+z may satisfy x*0.8≤y+z≤x*1.2. Alternatively, y+z may satisfy x+y+z=1. In addition, z may satisfy 0.15≤z≤0.4. The light guide layer may be in the form of a stack of two layers having different bandgaps, or may be in the form of a stack of multiple pairs of layers having different bandgaps. The $In_aAl_{(1-a)}P$ layer may have an index of refraction of 2.9 to 3.0, and the $In_xGa_yAl_zP$ layer may have an index of refraction of 3.05 to 3.2. By placing the two layers, a difference in index of refraction between which is 0.05 to 0.3, inside the semiconductor layer stack, light generated by the active layer can be guided to a desired direction for extraction, thereby improving light extraction efficiency.

In one embodiment, the light guide layer may be disposed between the active layer 60 and the first window layer 31. Accordingly, among light generated by the active layer 60, light traveling toward the first window layer 31 can be redirected toward the second window layer 32 by the light guide layer, thereby improving light extraction. Here, the light guide layer may include two layers, wherein at least one of the two layers is doped with an n-type dopant and the two layers have different dopant concentrations. Alternatively, the light guide layer may include two layers, wherein the two layers are both doped with an n-type dopant and have different dopant concentrations. Alternatively, the light guide layer may include two layers, wherein the two layers are both doped with an n-type dopant and have the same dopant concentration. When the light guide layer includes an n-type doped layer, the light guide layer can guide light while facilitating electron transport.

In another embodiment, the light guide layer may be disposed between the active layer 60 and the second window layer 32. Accordingly, among light generated by the active layer 60, light traveling toward the second window layer 32 can be redirected toward the first window layer 31 by the light guide layer, thereby improving light extraction. Here, the light guide layer may include two layers, wherein at least one of the two layers is doped with a p-type dopant and the two layers have different dopant concentrations. Alternatively, the light guide layer may include two layers, wherein the two layers are both doped with a p-type dopant and have different dopant concentrations. Alternatively, the light guide layer may include two layers, wherein the two layers are both doped with a p-type dopant and have the same dopant concentration. When the light guide layer includes a p-type doped layer, the light guide layer can guide light while facilitating positive hole transport.

The insulating layer 90 covers almost the entirety of an exposed surface of the light emitting device, and may include $SiO_2$. The first ohmic electrode 81 and the first bump 101 may be electrically connected to each other through an opening 95 formed in the insulating layer 90 on an upper surface of the first ohmic electrode 81, and the second ohmic electrode 82 and the second bump 102 may be electrically connected to each other through an opening 95 formed in the insulating layer 90 on an upper surface of the second ohmic electrode 82. The first bump 101 and the second bump 102 may be formed of a conductive material, for example, Ge, Al, Cu, Ag, Au, Ni, Cr, Ti, Pt, Rd, Ru, W, Mo, and TiW.

An edge of the second bump 102 formed on the upper surface of the second ohmic electrode 82 may lie inside an edge of the insulating layer 90. The width of the second bump 102 may be smaller than or equal to the width of the second ohmic electrode 82.

An edge of the first bump 101 formed on the upper surface of the first ohmic electrode 81 may extend to the upper surface of the first window layer 31 beyond the edge of the insulating layer 90. The first bump 101 may have a greater width than the first ohmic electrode 81.

According to this embodiment, the first window layer 31, the first ohmic electrode 81, and the first cladding layer 41 are of a first conductive type, and the second window layer 32, the second ohmic electrode 82, and the second contact layer 72 are of a second conductive type. The first conductive type and the second conductive type are of opposite polarity to each other. That is, when the first conductive type is n-type, the second conductive type is p-type, and vice versa.

Although FIG. 1 illustrates that the mesa M has vertical sides, it will be understood that the present invention is not limited thereto and at least some sides of the mesa M may be inclined.

FIG. 3*a* to FIG. 3*m* are sectional views sequentially illustrating a method of manufacturing the light emitting device according to the first embodiment.

Figure 3A:
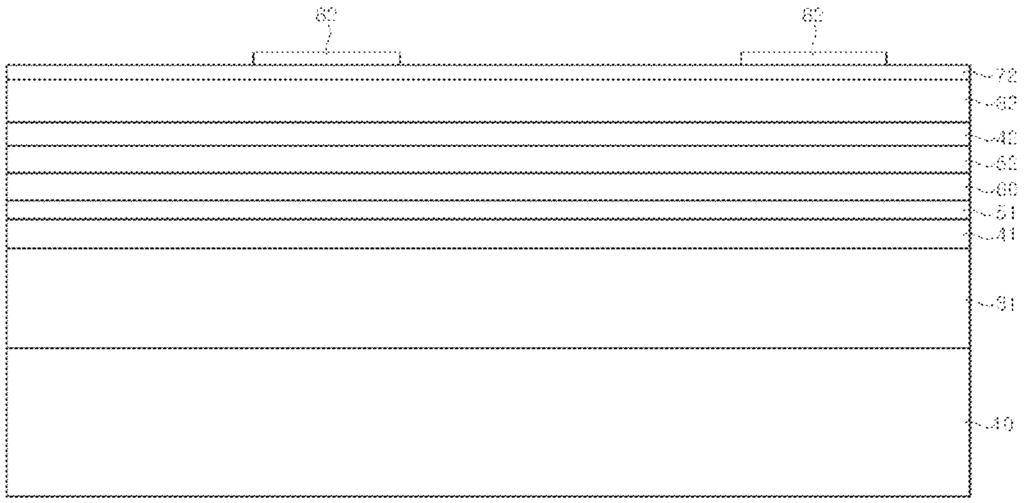
FIG. 3*a* to FIG. 3*m* are sectional views sequentially illustrating a process of manufacturing the light emitting device according to the first embodiment.

Referring to FIG. 3*a*, the method includes a “p-ohmic process” in which each layer is grown on a growth substrate 10, followed by forming the second ohmic electrode 82 on the second window layer 32 (or on the second contact layer 72 when the light emitting device includes the second contact layer 72). The growth substrate 10 may be a gallium arsenide (GaAs) substrate.

A buffer layer (not shown) may be formed between the growth substrate 10 and the first window layer 31. The buffer layer may have a thickness of about 300 nm, and may be a gallium arsenide (GaAs) layer.

An etch stop layer (ESL) may be formed between the growth substrate 10 and the first window layer 31 (or between the buffer layer and the first window layer 31 when the light emitting device includes the buffer layer) to prevent other thin films from being damaged by an etchant. However, the etch stop layer may be omitted if desired.

Figure 3B:
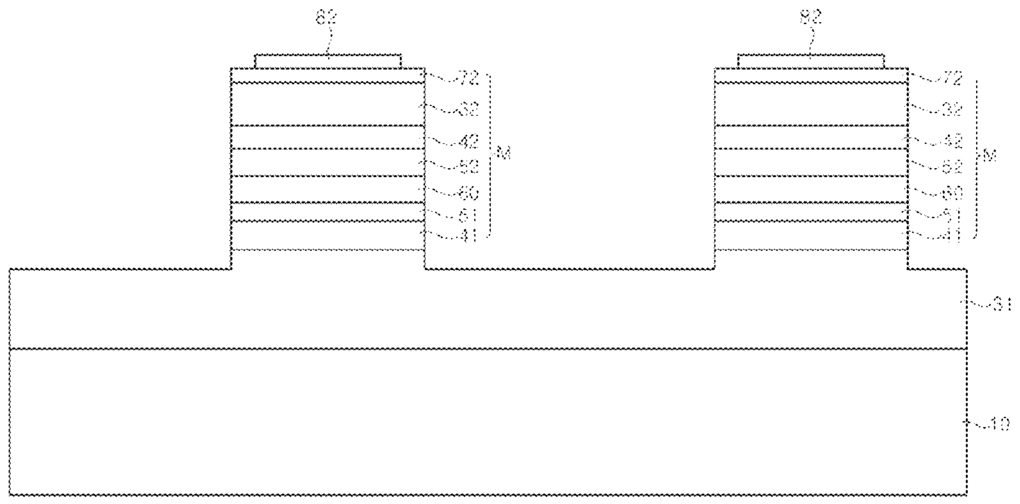

Referring to FIG. 3*b*, the method includes a “mesa process” in which the grown layers are partially etched to form a mesa M. In the mesa process, the first high-level doped layer of the first window layer 31 is exposed. Although the mesa M is shown as having vertical sides in FIG. 3*b*, it will be understood that the present invention is not limited thereto and at least some sides of the mesa M may be inclined. The same applies hereinafter.

Figure 3C:
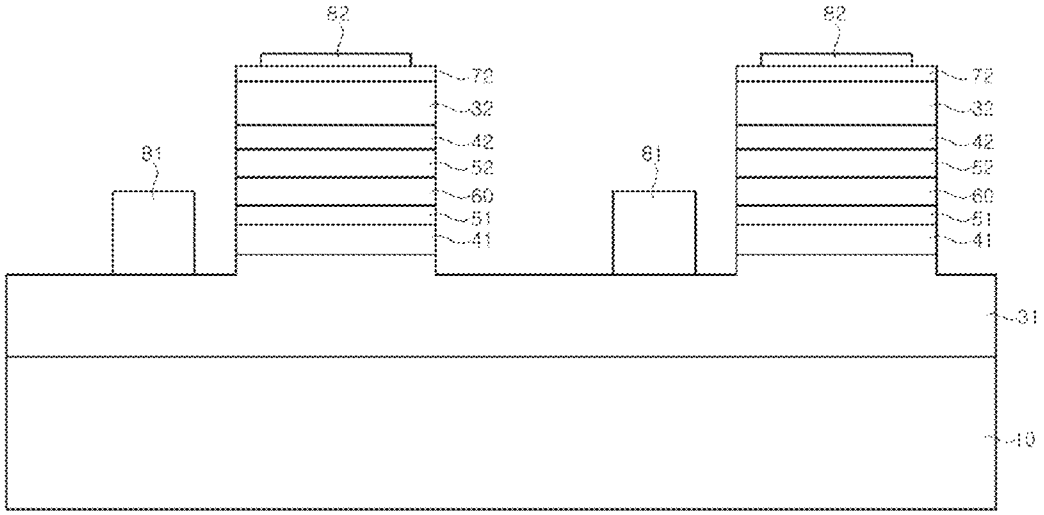

Referring to FIG. 3*c*, the method includes an “n-ohmic process” in which the first ohmic electrode 81 contacting the first high-level doped layer is formed on the first window layer 31. The first ohmic electrode 81 may be formed such that an upper surface thereof is flush with an upper surface of the second ohmic electrode 82.

Figure 3D:
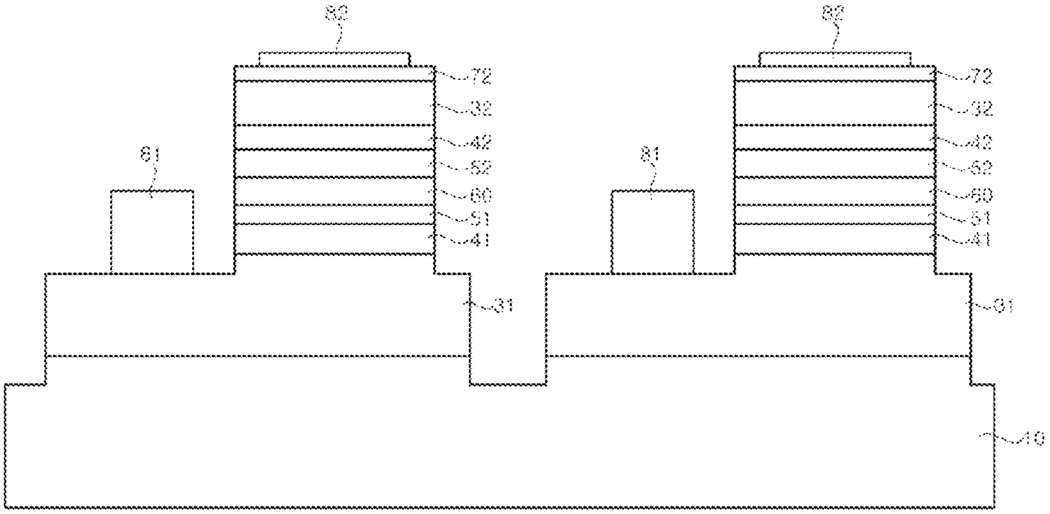

Referring to FIG. 3*d*, the method includes an “isolation (ISO) process” in which a stack of the layers grown integrally on the growth substrate 10 is divided into individual light emitting devices.

Figure 3E:
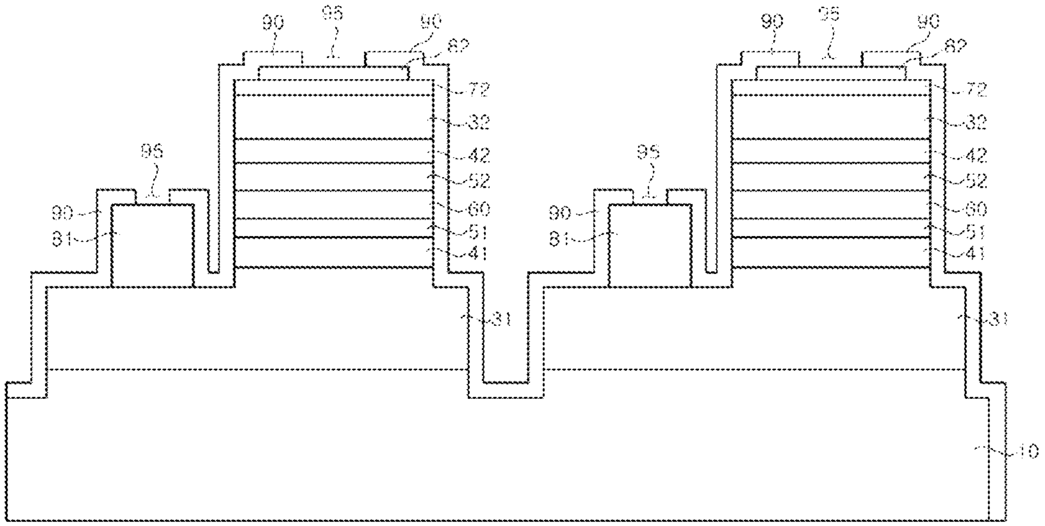

Referring to FIG. 3*e*, the method includes a “passivation and via process” in which the insulating layer 90 is formed on an exposed surface of the light emitting device, followed by forming openings 95 in the insulating layer 90. The insulating layer 90 covers almost the entirety of the upper and side surfaces of the light emitting device, and the openings 95 may be formed in the insulating layer 90 on the upper surface of the first ohmic electrode 81 and the insulating layer 90 on the upper surface of the second ohmic electrode 82, respectively.

Figure 3F:
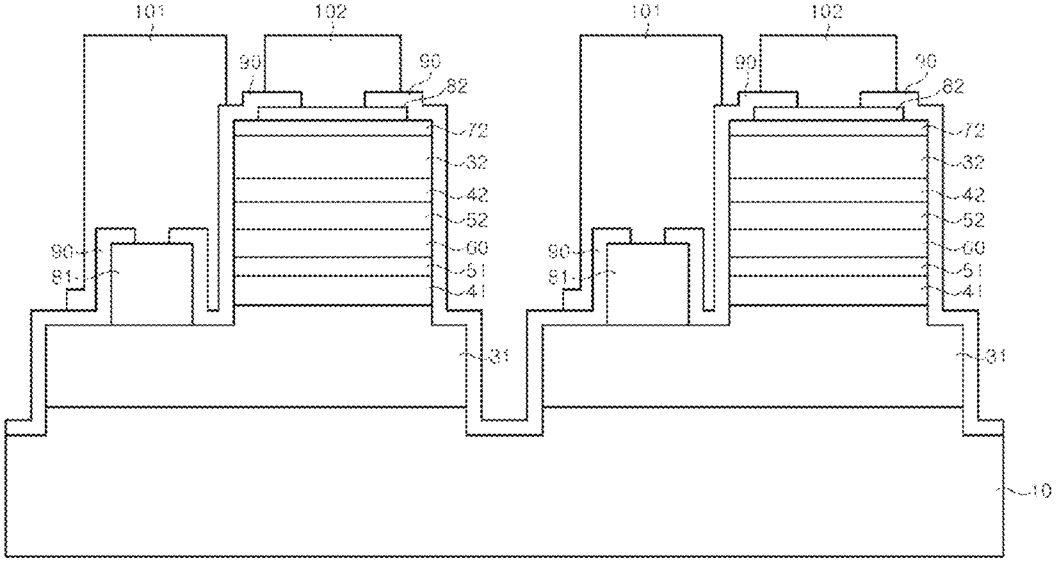

Referring to FIG. 3*f*, the method includes a “bump process” in which the first bump 101 and the second bump 102 are formed on the upper surface of the insulating layer 90. An edge of the second bump 102 formed on the upper surface of the second ohmic electrode 82 may lie inside an edge of the insulating layer 90, and an edge of the first bump 101 formed on the upper surface of the first ohmic electrode 81 may extend to the upper surface of the first window layer 31 beyond the edge of the insulating layer 90.

Figure 3G:
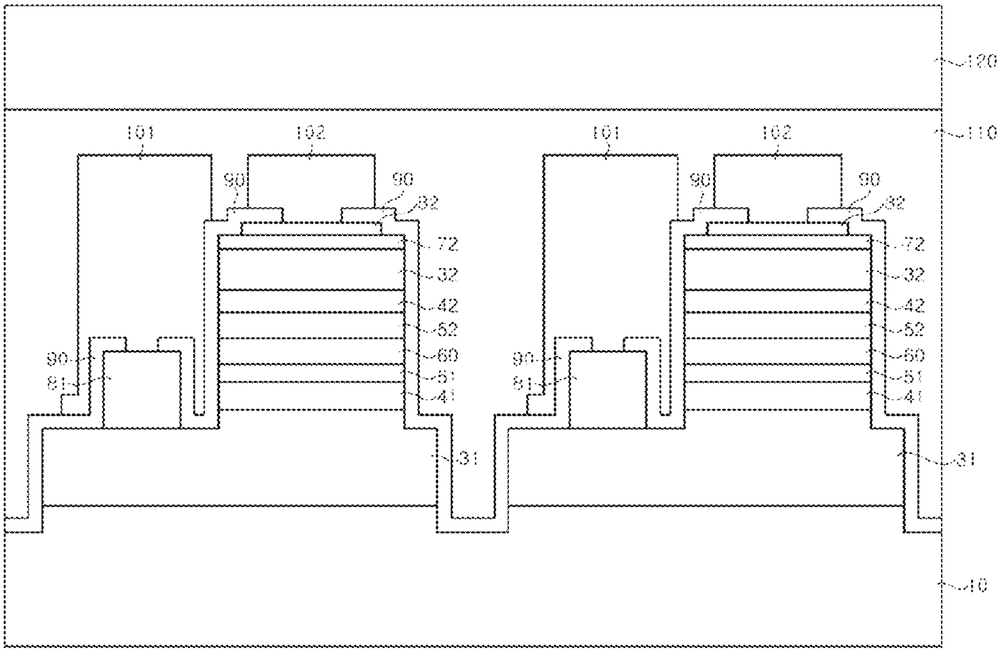

Referring to FIG. 3*g*, the method includes a “temporary bonding process” in which a temporary substrate 120 is bonded to exposed upper surfaces of the insulating layer 90, the first bump 101, and the second bump 102 (that is, surfaces thereof opposite the growth substrate 10).

The temporary substrate 120 serves to support the light emitting device during a growth substrate 10 removal process described below, and may be any one selected from among a sapphire substrate, a silicon substrate, and a gallium nitride substrate.

The temporary substrate 120 may be bonded via a bonding layer 110. That is, the bonding layer 110 may be formed on the exposed upper surfaces of the insulating layer 90, the first bump 101, and the second bump 102, followed by forming the temporary plate 120 on an upper surface of the bonding layer 110.

Figure 3H:
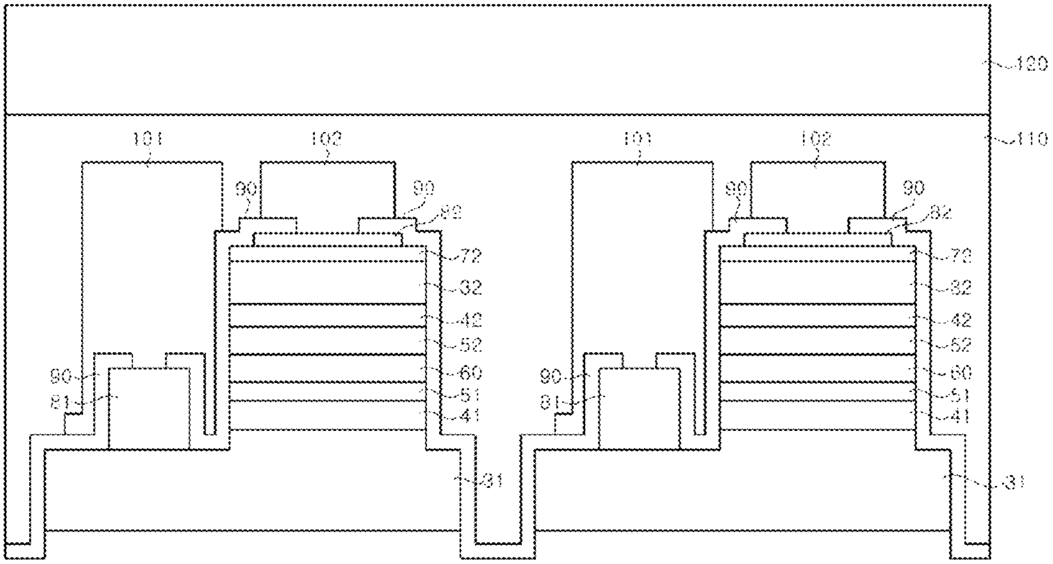

Referring to FIG. 3*h*, the method includes a "growth substrate removal process" in which the growth substrate 10 is removed using techniques such as mechanical polishing, laser lift-off, chemical lift-off, and the like.

Figure 3I:
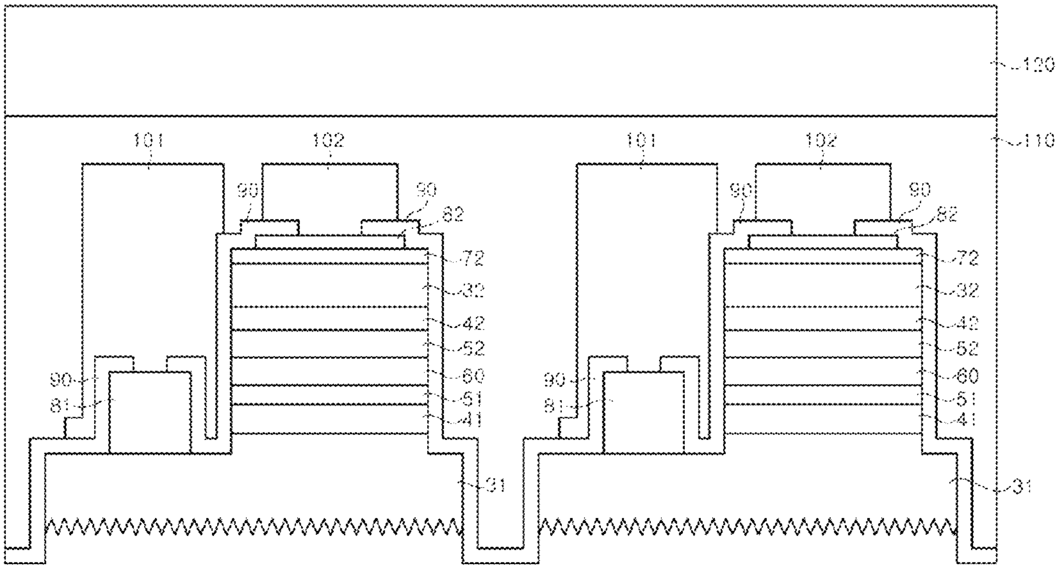

Referring to FIG. 3*i*, the method includes a "texturing process" in which the lower surface of the first window layer 31, which has been exposed after removal of the growth substrate 10, is textured.

In the case of a conventional light emitting device, a material having light absorbing properties, such as gallium arsenide (GaAs) is used as a growth substrate, causing difficulty in texturing. Conversely, according to the present invention, it is possible to texture a light exit surface of the light emitting device, thereby providing improved luminous efficacy.

Figure 3J:
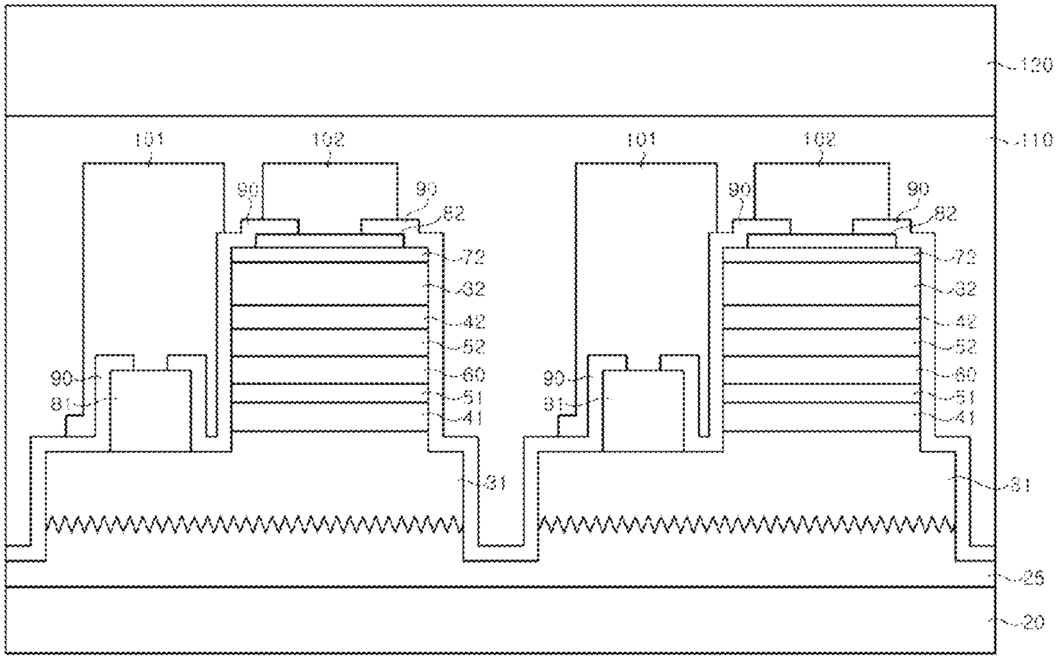

Referring to FIG. 3*j*, the method includes a "permanent bonding process" in which the first light-transmissive layer 20 is bonded to the low surface of the first window layer 31 (that is, a surface thereof opposite the temporary plate 120).

The second light-transmissive layer 25 may be formed between the first light-transmissive layer 20 and the first window layer 31. The second light-transmissive layer 25 may serve as a bonding layer to bond the first window layer 31 to the first light-transmissive layer 20, and may be any light-transmissive material, such as silicon, polyimide, polypropylene, benzocyclobutene (BCB), and silicon dioxide. The second light-transmissive layer 25 may have a different index of refraction than the first window layer 31 and the first light-transmissive layer 20 to form an interface having a different index of refraction than the first window layer 31 and the first light-transmissive layer 20, thereby allowing effective light refraction and thus improving light extraction.

Figure 3K:
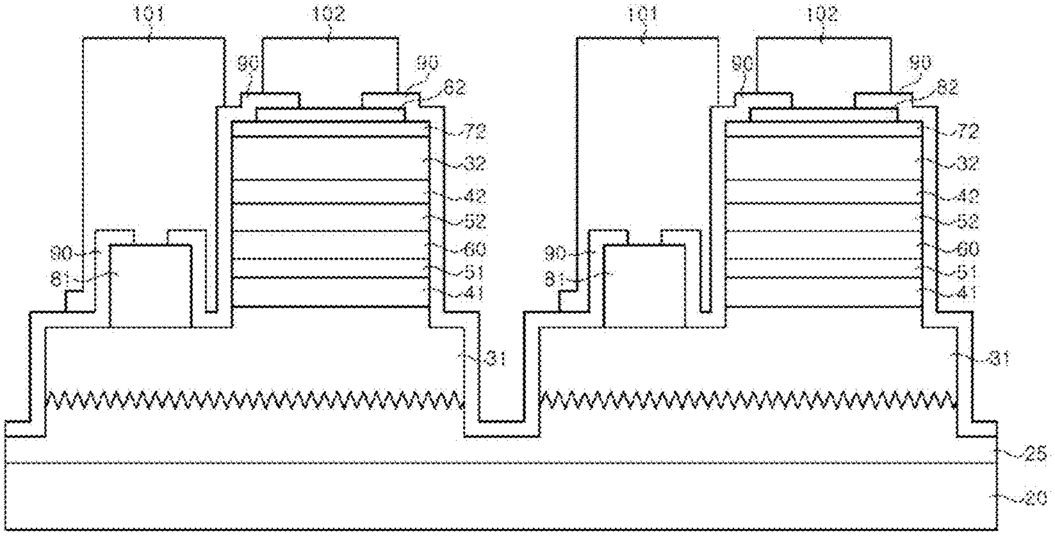

Referring to FIG. 3*k*, the method includes a "temporary bonding removal process" in which the temporary substrate 120 is removed. The temporary substrate 120 may be removed by chemically melting away the bonding layer 110.

Figure 3L:
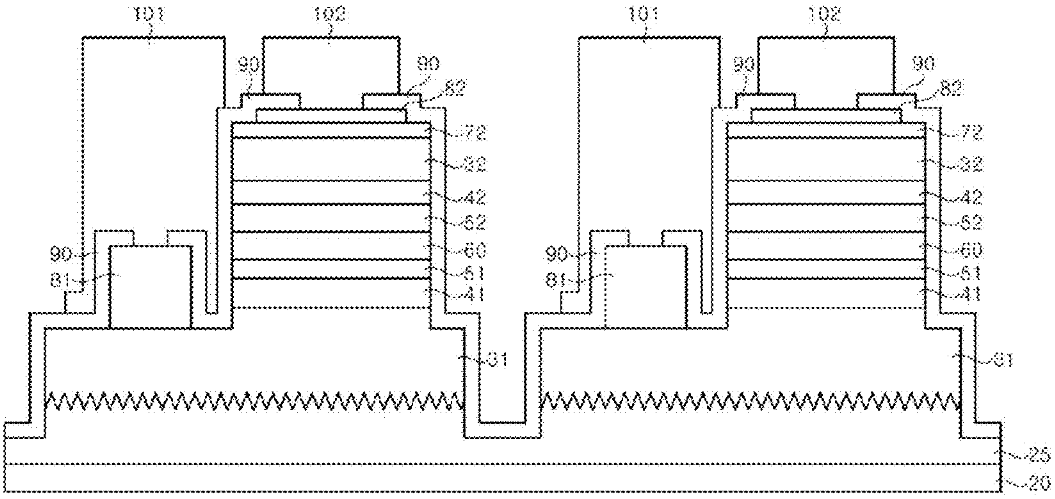

Referring to FIG. 3*l*, the method includes a "thinning process" in which the first light-transmissive layer 20 is thinned to a desired thickness.

Figure 3M:
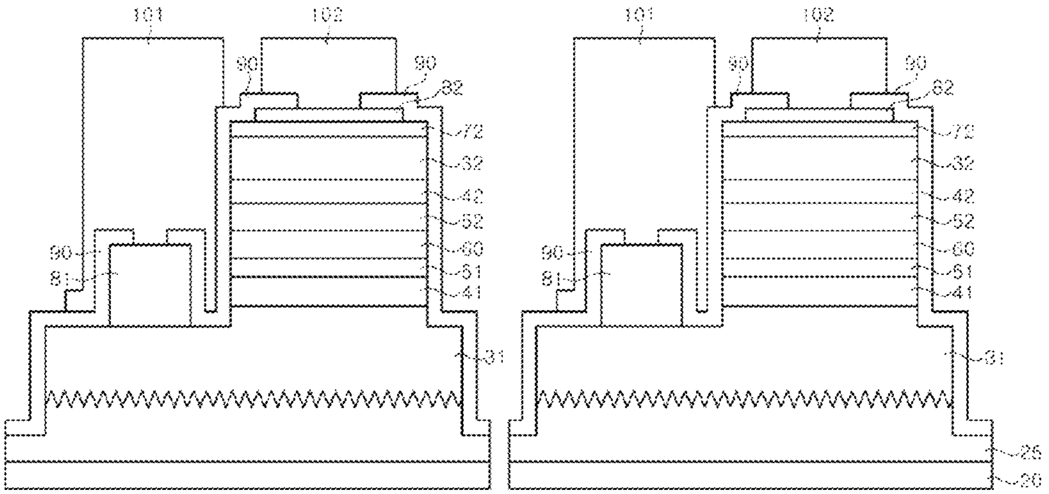

Referring to FIG. 3*m*, the method includes a "breaking process" in which the resulting layer stack is broken into individual chips. The breaking process may be performed by stealth dicing (SD). Although not shown, the first light-transmissive layer 20 may have corrugations on an outer peripheral surface thereof, which can increase light diffusion efficiency. An outer edge of the first light-transmissive layer 20 may be located outside an outer edge of the light emitting device. Thus, the first light-transmissive layer 20 has a larger area than the light emitting device and stably supports the light emitting device, thereby protecting the light emitting device from external force applied thereto. In addition, since a transverse width w2 of the first light-transmissive layer 20 is greater than a transverse width w1 of the light emitting device, it is possible to ensure that light from the light emitting device is effectively emitted to the outside through the first light-transmissive layer 20 even when the light emitting device has a wide beam angle. The second light-transmissive layer 25 may include regions of different thicknesses. Specifically, a thickness t2 of a region of the second light-transmissive layer 25, which is located outside the outer edge of the light-emitting device and does not overlap the light-emitting device, may be smaller than a thickness t1 of a region of the second light-transmissive layer 25, which overlaps the light-emitting device. Accordingly, the insulating layer 90 covering the light emitting device may extend to the region having a smaller thickness t2. Since the second light-transmissive layer 25 includes regions of different thicknesses, the second light-transmissive layer 25 has an increased surface area, thereby lengthening the path of water intrusion into the light emitting device and thus increasing lifespan of the light emitting device. An outer edge of the first window layer 31 may include a slope.

Figure 3N:
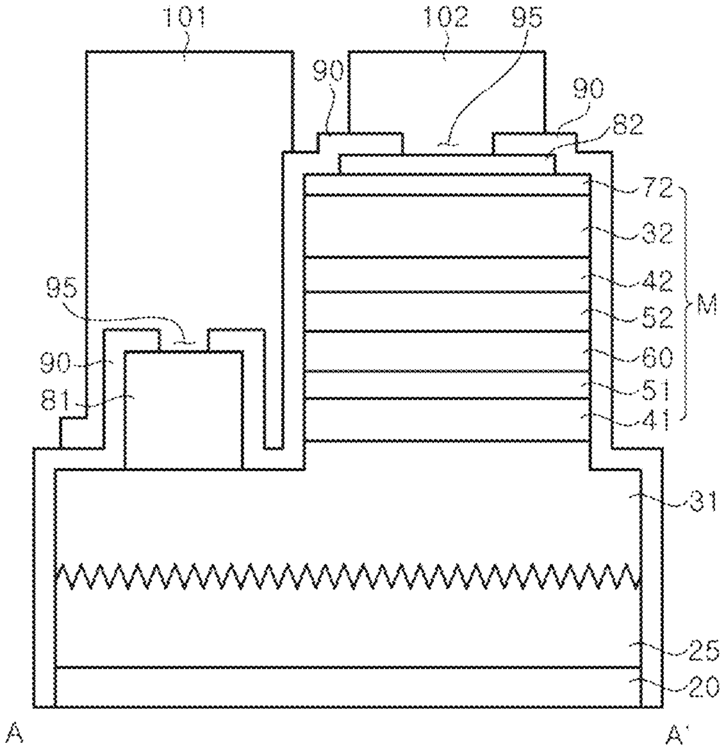
FIG. 3*n* is a schematic sectional view of a light emitting device according to another embodiment of the present invention.

FIG. 3*n* is a schematic sectional view of a light emitting device according to another embodiment of the present invention. Referring to FIG. 3*n*, an outer edge of the first window layer 31 may be in line with an outer edge of the second light-transmissive layer 25, and an outer edge of the second light-transmissive layer 25 may be in line with an outer edge of the first light-transmissive layer 20.

Figure 3O:
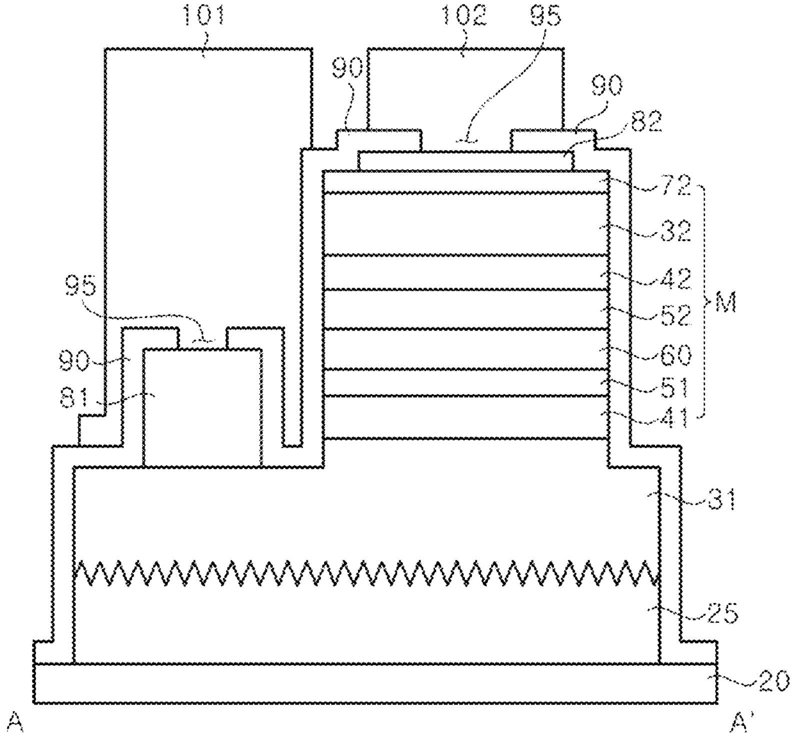
FIG. 3*o* is a schematic sectional view of a light emitting device according to a further embodiment of the present invention.

FIG. 3*o* is a schematic sectional view of a light emitting module of a further embodiment of the present invention. Referring to FIG. 3*o*, an outer edge of the first light-transmissive layer 20 may be exposed outside the second light-transmissive layer 25. In addition, the exposed surface of the first light-transmissive layer 20 may be covered with an insulating material, wherein the insulating material covering the surface of the first light-transmissive layer 20 may be a different material than the second light-transmissive layer 25. The insulating material may be the same material as the insulating layer 90 covering the light emitting device. The insulating material may also cover side surfaces of the second light-transmissive layer 25.

Figure 4:
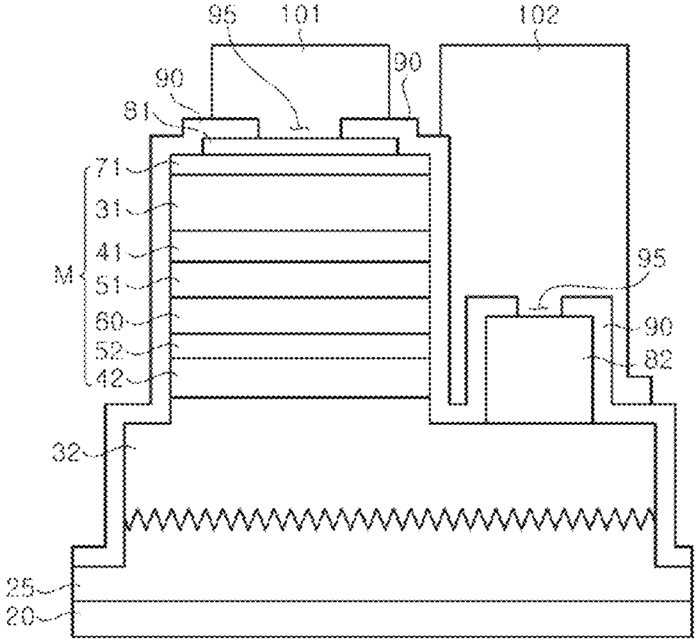
FIG. 4 is a schematic sectional view of a light emitting device according to yet another embodiment of the present invention.

FIG. 4 is a schematic sectional view of a light emitting device according to yet another embodiment of the present invention.

The light emitting device of FIG. 4 differs from the light emitting device of FIG. 1 in that the light emitting device of FIG. 4 includes a first contact layer 71 instead of the second contact layer 72 and the position of a mesa M thereof is opposite the position of the mesa of the light emitting device of FIG. 1.

In this embodiment, the first window layer 31, the first ohmic electrode 81, the first cladding layer 41, and the first contact layer 71 are of a first conductive type, and the second window layer 32, the second ohmic electrode 82, and the second cladding layer 42 are of a second conductive type. The first conductive type and the second conductive type are of opposite polarity to each other. That is, when the first conductive type is n-type, the second conductive type is p-type, and vice versa. In the following description, layers of the first conductive type will be collectively referred to as "a first conductive layer", and layers of the second conductive type will be collectively referred to as a "second conductive layer".

In addition, the light emitting device of FIG. 4 differs from the light emitting device of FIG. 1 in that the second window layer 32 is disposed on the first light-transmissive layer 20, the active layer 60 is disposed on the second window layer 32, the first window layer 31 is disposed on the active layer 60, the first contact layer 71 is disposed on the first window layer 31, and the first ohmic electrode 81 is disposed on the first contact layer 71.

When the light emitting device of FIG. 4 includes the first cladding layer 41, the second cladding layer 42, the first electron control layer 51, and the first positive hole control layer 52, the second cladding layer 42 is disposed on the second window layer 32, the first positive hole control layer 52 is disposed on the second cladding layer 42, and the active layer 60 is disposed on the first positive hole control layer 52, the first electron control layer 51 is disposed on the active layer 60, the first cladding layer 41 is disposed on the first electron control layer 51, the first window layer 31 is disposed on the first cladding layer 41, the first contact layer 71 is disposed on the first window layer 31, and the first ohmic electrode 81 is disposed on the first contact layer 71.

The following description will focus on different features of the light emitting device of FIG. 4 from those of the light emitting device according to the first embodiment shown in FIG. 1.

The light emitting device according to this embodiment emits red series light, unlike the light emitting device according to the first embodiment, which may emit blue series and green series light (including cyan, orange, and yellow; the same applies hereinafter) as well as red series light.

In order to manufacture a light emitting device that emits red series light, a phosphide-based material may be grown. In order to grow the phosphide-based material, a growth substrate having light absorbing properties, such as a gallium arsenide (GaAs) substrate, may be used.

In the case of using a growth substrate having light absorbing properties, if the light emitting device is used without removing the growth substrate therefrom, light emitted from the active layer 60 can be absorbed by the growth substrate, causing reduction in luminous efficacy of the light emitting device.

Accordingly, for the light emitting device according to this embodiment, a mesa M is formed by etching from below (that is, from the first window layer 31 in FIG. 3*a*), after a substrate having high light transmittance, such as a sapphire substrate, is placed opposite the growth substrate 10 and the growth substrate 10 is removed, unlike the light emitting device according to the first embodiment, in which a mesa M is formed by etching from above (that is, from the second contact layer 72 in FIG. 3*a*).

As mentioned above, since a mesa M is formed by etching from below for the light emitting device according to this embodiment, for the light emitting device according to this present embodiment, the second conductive layer is disposed under the first conductive layer, unlike the light emitting device according to the first embodiment, in which the first conductive layer is disposed under the second conductive layer.

Figure 5:
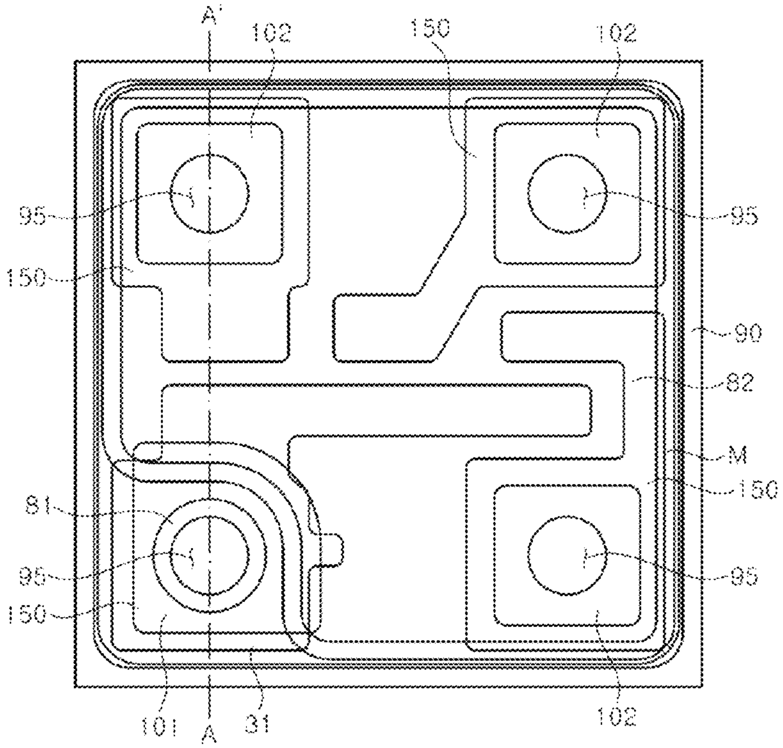
FIG. 5 is a schematic plan view of a light emitting module according to a first embodiment of the present invention, to which the light emitting device according to the present invention is applied.
Figure 6:
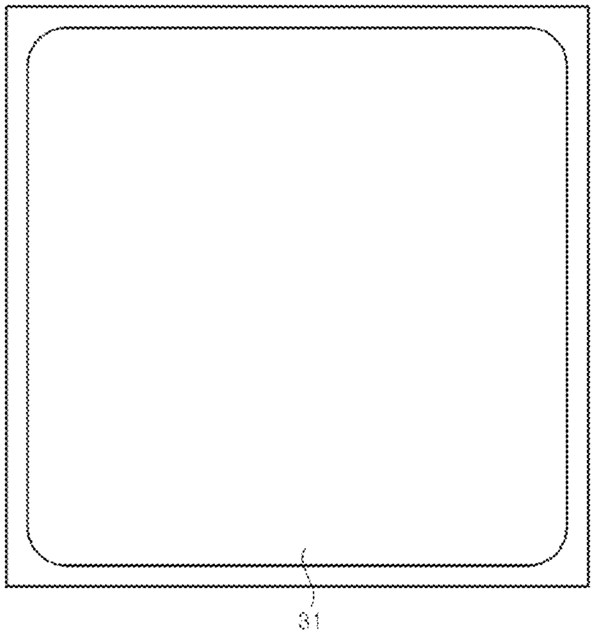
FIG. 6 is a schematic plan view of a first window layer of the light emitting module of FIG. 5.
Figure 7:
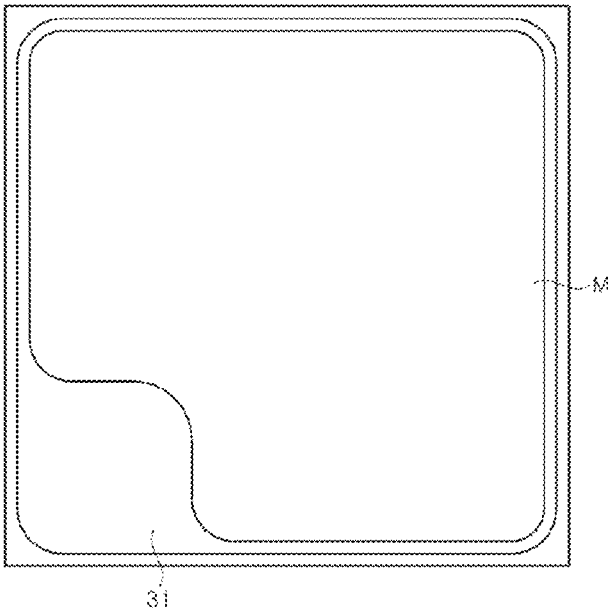
FIG. 7 is a schematic plan view of a mesa of the light emitting module of FIG. 5.
Figure 8:
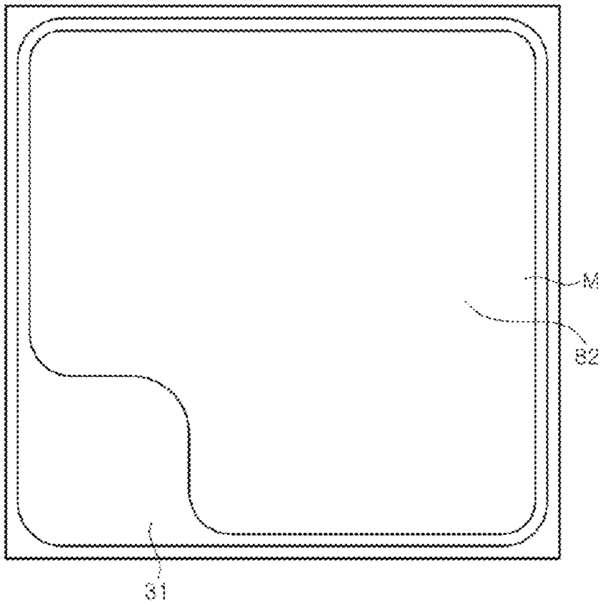
FIG. 8 is a schematic plan view of a second ohmic electrode of the light emitting module of FIG. 5.
Figure 9:
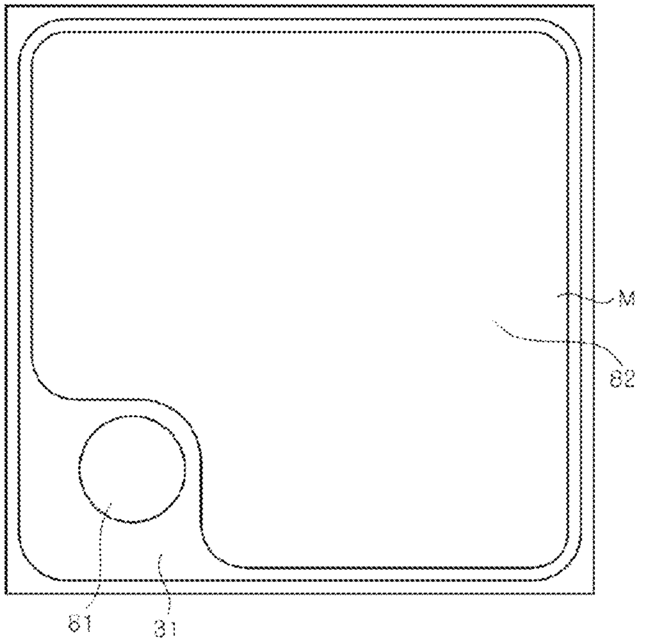
FIG. 9 is a schematic plan view of a first ohmic electrode of the light emitting module of FIG. 5.
Figure 10:
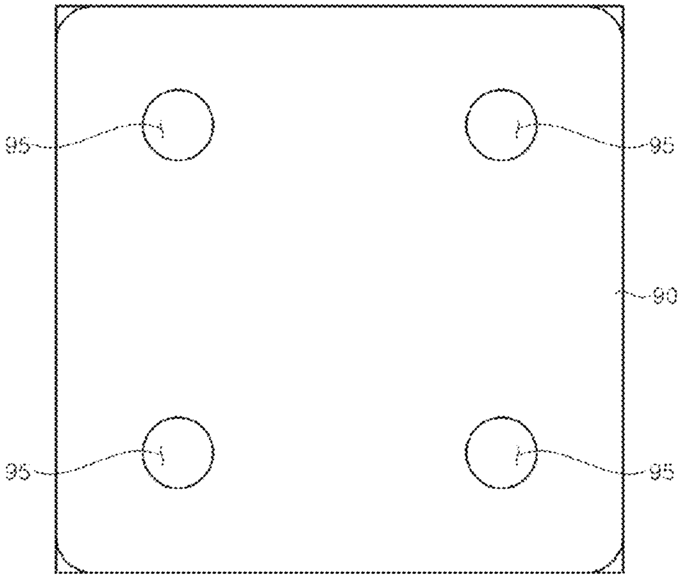
FIG. 10 is a schematic plan view of an insulating layer of the light emitting module of FIG. 5.
Figure 11:
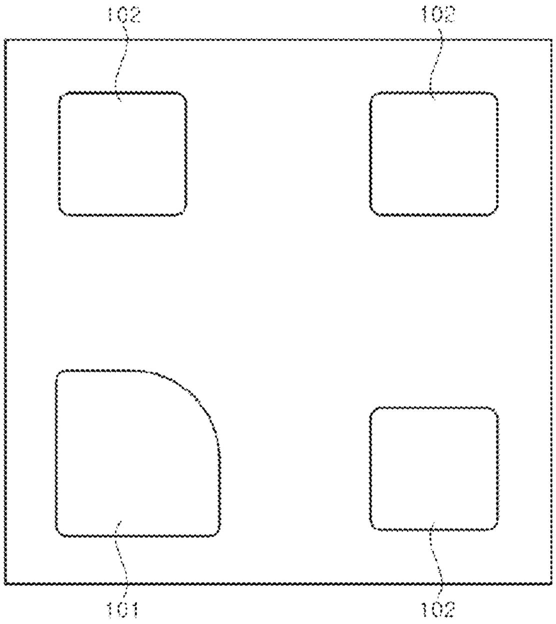
FIG. 11 is a schematic plan view of a bump of the light emitting module of FIG. 5.
Figure 12:
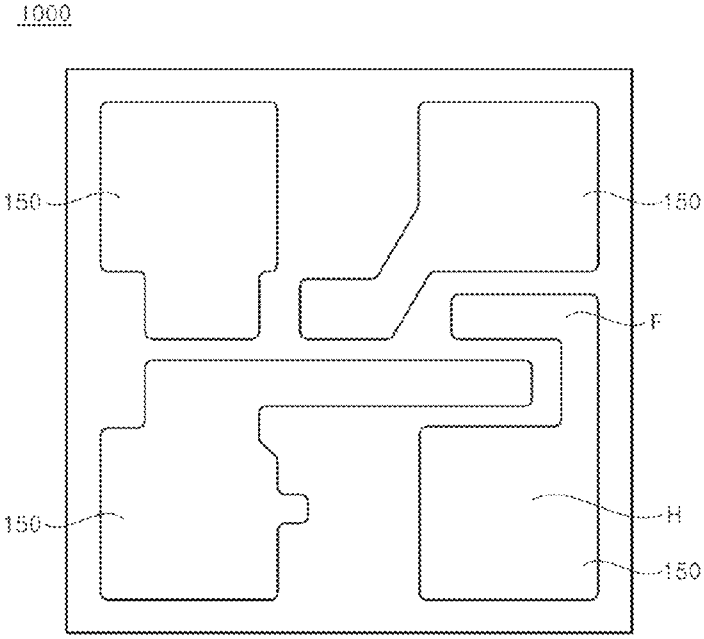
FIG. 12 is a schematic plan view of an electrode pad of the light emitting module of FIG. 5.

FIG. 5 is a schematic plan view of a light emitting module according to a first embodiment of the present invention, to which the light emitting device according to the present invention is applied, FIG. 6 is a schematic plan view of a first window layer of the light emitting module of FIG. 5, FIG. 7 is a schematic plan view of a mesa of the light emitting module of FIG. 5, and FIG. 8 is a schematic plan view of a second ohmic electrode of the light emitting module of FIG. 5, FIG. 9 is a schematic plan view of a first ohmic electrode of the light emitting module of FIG. 5, FIG. 10 is a schematic plan view of an insulating layer of the light emitting module of FIG. 5, FIG. 11 is a schematic plan view of a bump of the light emitting module of FIG. 5, and FIG. 12 is a schematic plan view of an electrode pad of the light emitting module of FIG. 5. Here, the A-A' section of FIG. 5 may correspond to the A-A' section of the light emitting devices shown in FIG. 1, FIG. 3*n*, and FIG. 3*o*.

Referring to FIG. 5 and FIG. 6, in plan view, the first window layer 31 according to this embodiment may correspond in shape to the first light-transmissive layer 20, and may be rounded at each corner. In addition, in plan view, the first window layer 31 may have a smaller area than the first light-transmissive layer 20.

Referring to FIG. 5 and FIG. 7, in plan view, the mesa M according to this embodiment may correspond in shape to the first window layer 31 except that the mesa M has a depression at one corner or at least a portion of one side thereof, and may be rounded at each corner. In addition, in plan view, the mesa M may have a smaller area than the first window layer 31. The mesa M may include a light emitting region that contributes substantially to light emission.

Referring to FIG. 5 and FIG. 8, in plan view, the second ohmic electrode 82 according to this embodiment may have a depression at one corner to correspond in shape to the mesa M, and may be rounded at at least a portion of each corner. In plan view, the second ohmic electrode 82 may have a smaller area than the mesa M. The second ohmic electrode 82 may be located inside an outer edge of the mesa M. The second ohmic electrode may be a light-reflective material, or may be a light-transmissive material. The light-reflective material may include at least one selected from among materials having a property of reflecting at least some wavelengths of light, such as Ge, Al, Cu, Ag, Au, Ni, Cr, Ti, Pt, Rd, Ru, W, Mo, and TiW, and the light-transmissive material may include at least one selected from among materials having a property of transmitting at least some wavelengths of light, such as ITO and ZnO.

Referring to FIG. 5 and FIG. 9, the first ohmic electrode 81 according to this embodiment may be disposed on the first window layer 31 to be at least partially enclosed by the depression of each of the mesa M and the second ohmic electrode 82 in plan view. The first ohmic electrode 81 may have a circular, elliptical, or rectangular shape in plan view, without being limited thereto.

Referring to FIG. 5 and FIG. 10, in plan view, the insulating layer 90 according to this embodiment may correspond in shape to the first light-transmissive layer 20, and may be rounded at each corner. Alternatively, the insulating layer 90 may cover the entirety of the first light-transmissive layer 20, including the corners thereof. In addition, a horizontal distance between opposite ends of the insulating layer 90 may be equal to a distance between opposite ends of the first light-transmissive layer 20. Further, in plan view, the insulating layer 90 may correspond in area to the first light-transmissive layer 20. The insulating layer 90 may have multiple openings 95, for example, a total of four openings 95, one in each quadrant thereof. Through the openings 95 formed in the insulating layer 90, the first and second ohmic electrodes 81, 82 are electrically connected to the first and second bumps 101, 102, respectively. The insulating layer 90 may be a light-transmissive material, or may be a material having oxide film properties. For example, the insulating layer 90 may be a material such as $SiO_2$, $TiO_2$, $AlO_x$, or $NiO_x$.

Referring to FIG. 5 and FIG. 11, the light emitting module according to this embodiment may include multiple bumps 101, 102, specifically a first bump 101 connected to the first ohmic electrode 81 and a second bump 102 connected to the second ohmic electrode 82. For example, one first bump 101 and three second bumps 102 may be disposed at the corners of the light emitting module, respectively. However, it will be understood that the present invention is not limited thereto and at least one second bump 102 may be disposed. In plan view, one corner of the first bump 101 may have a smaller curvature than the other corners thereof. In plan view, the second bump 102 may have a square or rectangular shape, without being limited thereto. In addition, in plan view, each of the first bump 101 and the second bump 102 may be rounded at each corner.

Referring to FIG. 5 and FIG. 12, the light emitting module according to this embodiment may include a module substrate 1000 that includes multiple electrode pads 150 each electrically connected to a corresponding one of the multiple bumps 101, 102. By electrically connecting the multiple bumps 101, 102 to the respective electrode pads 150, the light emitting module according to this embodiment enables multiple times as much current (for example, when three bumps with the same electrical polarity are connected to respective electrode pads, three times as much current) to be injected from an existing driver into the light emitting module, thereby allowing implementation of a high-brightness display. At least some of the multiple electrode pads 150 may include a finger F extending from a main portion H thereof, and at least one of the fingers F may face a center of the light emitting module. The finger F may be different in width/length from the main portion H. In addition, the main portion H of each electrode pad 150 may include a respective finger F, wherein the respective fingers F may be spaced apart from each other. Further, at least two of the fingers F may be arranged in an interlocking pattern with a space therebetween.

Figure 13:
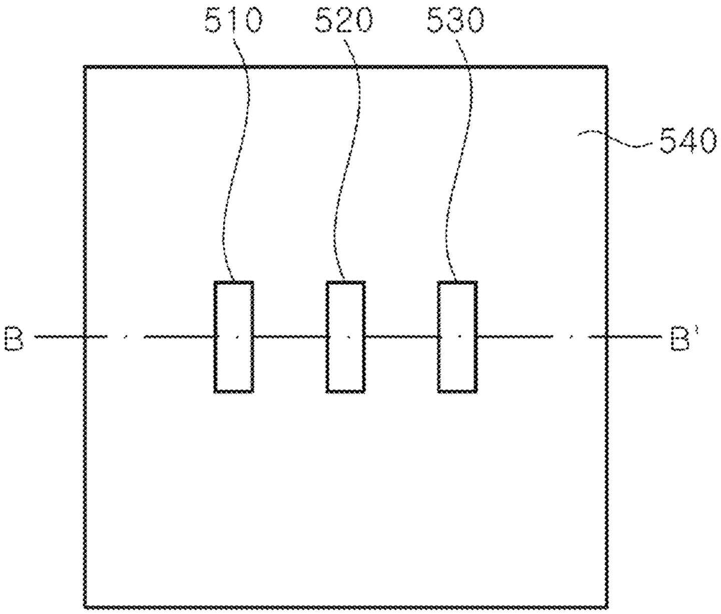
FIG. 13 shows schematic plan views of light emitting modules according to second and third embodiments, to which the light emitting device according to the present invention is applied.
Figure 14:
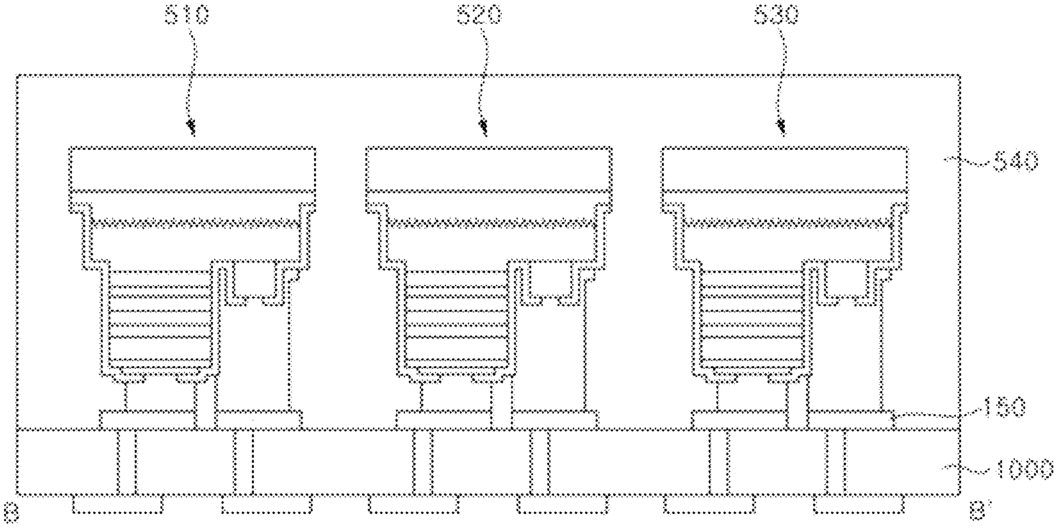
FIG. 14 is a schematic sectional view of the light emitting module according to the second embodiment, taken along line B-B' of FIG. 13.

FIG. 13 is a schematic plan view of a light emitting module according to a second embodiment, to which the light emitting device according to present invention is applied, and FIG. 14 is a schematic sectional view taken along line B-B' of FIG. 13.

Referring to FIG. 13 and FIG. 14, the light emitting module according to the second embodiment includes multiple light emitting devices 510, 520, 530 each disposed on a portion of the first light-transmissive layer 20, unlike the light emitting module according to the first embodiment, in which the light emitting device is formed across the entire plane of the light emitting module. For example, the light emitting module according to the second embodiment may include three side-by-side mounted light emitting devices 510, 520, 530.

The first light emitting device 510 may emit red series light, the second light emitting device 520 may emit green series light, and the third light emitting device 530 may emit blue series light. In another embodiment, the first light emitting device 510 may emit red series light, the second light emitting device 520 may emit yellow series light, and the third light emitting device 530 may emit cyan series light. In a further embodiment, the first to third light emitting devices 510, 520, 530 may all emit red series light.

Although FIG. 14 illustrates that the multiple light emitting devices 510, 520, 530 are all the light emitting device according to the first embodiment shown in FIG. 1, it will be understood that the present invention is not limited thereto and one or more of the multiple light emitting devices 510, 520, 530 may be the light emitting device illustrated in FIG. 3*n*, FIG. 3*o*, or FIG. 4.

The light emitting module according to this embodiment has the advantage that even a light emitting device emitting red series light is identical to light emitting devices emitting other colors of light in terms of the orientation of the mesa M, making it convenient to construct a circuit. Each of the light emitting devices 510, 520, 530 is electrically connected to an electrode pad 150, such that an active layer of each of the light emitting devices 510, 520, 530 emits a predetermined wavelength of light.

In one embodiment, a difference in emission peak wavelength between the light emitting devices 510, 520, 530 may be less than 5 nm, and the respective active layers of the light emitting devices 510, 520, 530 may be formed of the same elements. Alternatively, the light emitting devices 510, 520, 530 may comprise the same group V elements. Accordingly, multiple light emitting devices with similar electrical and optical properties can be grouped into a single unit and thus can be easily arranged in a module. Semiconductor layers constituting each of the light emitting devices 510, 520, 530 may include a first-type semiconductor layer and a second-type semiconductor layer, and each of the light emitting devices 510, 520, 530 may include the same first-type dopant, or may include the same second-type dopant. The multiple first-type semiconductor layers, that is, respective first-type semiconductor layers of the light emitting devices 510, 520, 530, may be identical to each other in terms of orientation with respect to the active layer. In addition, the multiple first-type semiconductor layers may be spaced apart from each other, and respective thicknesses of the multiple first-type semiconductor layers may be less than 30% different from each other. Alternatively, the multiple second-type semiconductor layers, that is, respective second-type semiconductor layers of the light emitting devices 510, 520, 530, may be identical to each other in terms of orientation with respect to the active layer. In addition, the multiple second-type semiconductor layers may be spaced apart from each other, and respective thicknesses of the second-type semiconductor layers may be less than 30% different from each other. In this way, it is possible to reduce a difference in luminous intensity between the light emitting devices due to a thickness difference between the respective semiconductor layers of the light emitting devices. Alternatively, the light emitting devices 510, 520, 530 may be arranged to be identical to each other in terms of the direction in which electrons are supplied to the active layer. Alternatively, the light emitting devices 510, 520, 530 may be arranged to be identical to each other in terms of the direction in which positive holes are supplied to the active layer. In this way, it is possible to prevent electric or magnetic field interference between the light emitting devices spaced apart from each other.

In another embodiment, a difference in emission peak wavelength between at least two of the multiple light emitting devices 510, 520, 530 may be 10 nm or more. In addition, at least one of the multiple light emitting devices 510, 520, 530 may include a different group V element than the others. Alternatively, at least one of the multiple light emitting devices 510, 520, 530 may include a group V element having a standard atomic weight of 30 or more. Alternatively, at least one of the multiple light emitting devices 510, 520, 530 may include a group V element having a different size than those of the others. Semiconductor layers constituting each of the light emitting devices 510, 520, 530 may include a first-type semiconductor layer and a second-type semiconductor layer, wherein the multiple first-type semiconductor layers, that is, respective first-type semiconductor layers of the light emitting devices 510, 520, 530, may be spaced apart from each other and may be identical to each other in terms of orientation with respect to the active layer. Alternatively, the multiple second-type semiconductor layers, that is, respective second-type semiconductor layers of the light emitting devices 510, 520, 530 may be spaced apart from each other and may be identical to each other in terms of orientation with respect to the active layer. In this way, light emitting devices forming a single light emitting module or pixel can be oriented in the same polarity direction, thereby minimizing a difference between distances from the respective active layers of the light emitting devices 510, 520, 530 to a light exit surface of a molded portion 540.

In a further embodiment, each of the light emitting devices 510, 520, 530 may have a different emission peak wavelength. Alternatively, each of the light emitting devices 510, 520, 530 may further include a substrate supporting each of the light emitting devices 510, 520, 530, wherein each of the substrates may be formed of the same material. That is, at least one of the light emitting devices 510, 520, 530 may have a different group V element or a different emission peak wavelength than the others and each of the respective substrates supporting the light emitting devices 510, 520, 530 may be formed of the same material, whereby variation in visibility depending on the type of substrate used can be reduced even when light exits the light emitting device through the substrate.

On an upper surface of the first light-transmissive layer 20, a molded portion 540 may be formed to cover the light emitting devices 510, 520, 530. The first light-transmissive layer 20 may be a substrate, for example, any one selected from among a sapphire substrate, a silicon substrate, and a gallium nitride substrate. Description of the same features as the first embodiment will be omitted below.

Figure 15:
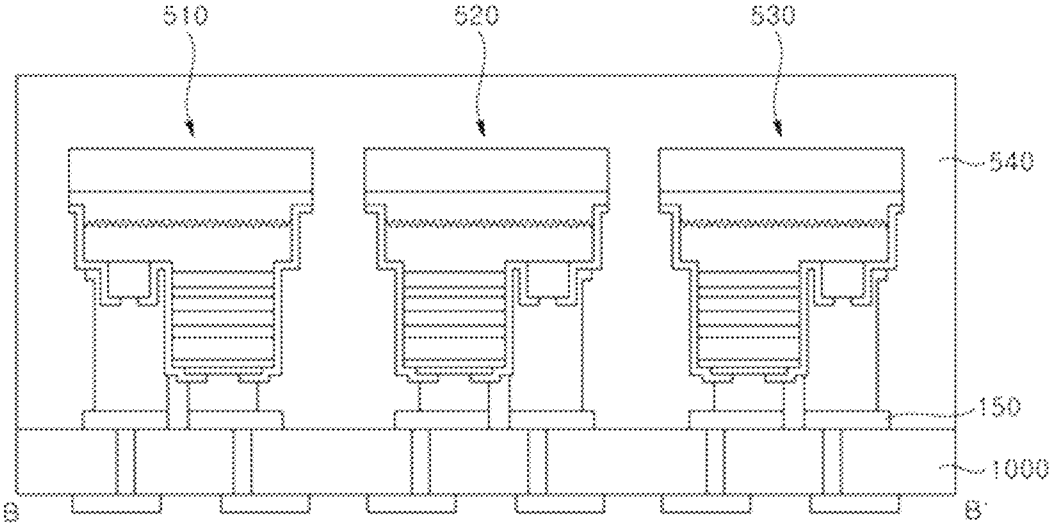
FIG. 15 is a schematic sectional view of the light emitting module according to the third embodiment, taken along line B-B' of FIG. 13.

FIG. 13 is a schematic plan view of a light emitting module according to a third embodiment, to which the light emitting device according to the present invention is applied, and FIG. 15 is a schematic sectional view taken along line B-B' of FIG. 13.

Referring to FIG. 13 and FIG. 15, the light emitting module according to this embodiment includes the light emitting device of FIG. 4 as a first light emitting device 510 and the light emitting device of FIG. 1 as a second light emitting device 520 and a third light emitting device 530.

Unlike the light emitting module of FIG. 14, in the light-emitting module according to this embodiment, the first light emitting device 510, which emits red series light, is different from the second and third light-emitting devices 520, 530, which emit other colors of light, in terms of orientation of a mesa M. Description of the same features as the first and second embodiments will be omitted.

Figure 16A:
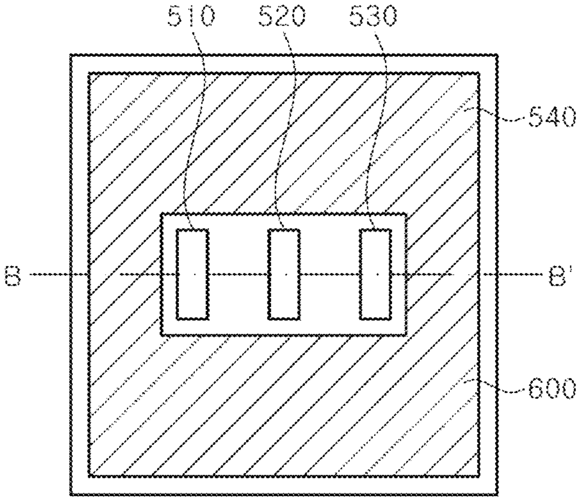
FIG. 16*a* is a schematic plan view of a light emitting module according to yet another embodiment of the present invention.
Figure 16B:
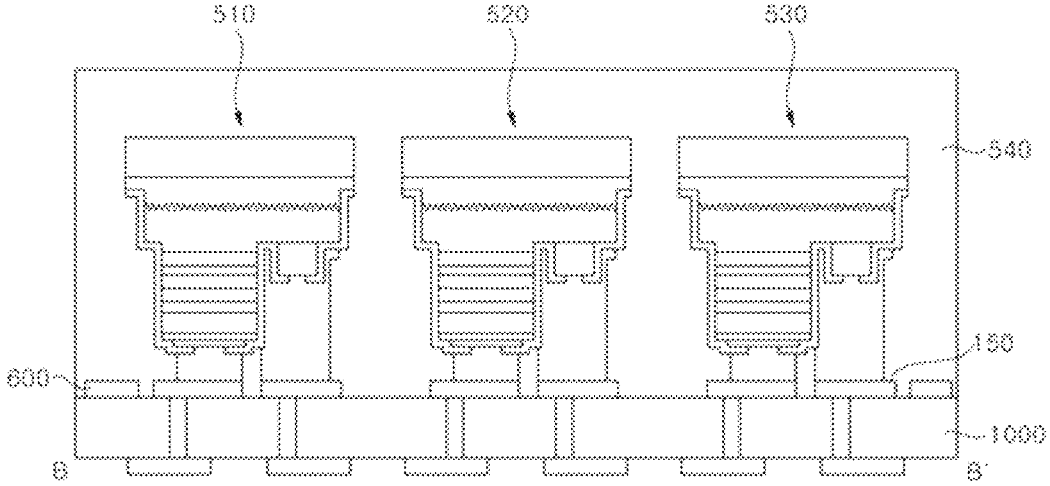
FIG. 16*b* is a schematic sectional view taken along line B-B' of FIG. 16*a*.

FIG. 16*a* is a schematic plan view of a light emitting module according to yet another embodiment of the present invention, and FIG. 16*b* is a schematic sectional view taken along line B-B' of FIG. 16*a*.

Referring to FIG. 16*a* and FIG. 16*b*, the light emitting module according to this embodiment may further include a light-reflective layer 600 disposed on an upper surface of a module substrate 1000, wherein the light reflective layer 600 may have a reflectance of 80% or more with respect to light emitted from light emitting devices 510, 520, 530.

Referring to FIG. 16*a*, in plan view, an opening may be formed inside the light-reflective layer 600 and the light emitting devices 510, 520, 530 may be disposed in the opening such that the light-reflective layer 600 surrounds the light emitting devices 510, 520, 530.

Referring to FIG. 16*b*, in side view, the light-reflective layer 600 extends outwardly from the opening, in which the light emitting devices 510, 520, 530 are disposed, along the upper surface of the module substrate 1000. The light-reflective layer 600 may have a thickness similar or equal to the thickness of an electrode pad 150, without being limited thereto.

Side surfaces of the light-reflective layer 600 may be covered with a molded portion 540. In this way, the light-reflective layer 600 can be prevented from delaminating from the module substrate 1000, which further flattens the surface of the light-reflective layer 600, thereby improving light reflection.

Although not shown, the light-reflective layer 600 may also extend into a region between the light emitting devices 510, 520, 530. The light-reflective layer 600 may be formed of a metal, or may be an insulating material. For example, the metal may be Al, Au, Au, Ni, Ti, or the like, and the insulating material may be silicon, polyimide, or the like.

Although not shown, each of the light emitting devices described herein may be independently operated or controlled and the light emitting module may be provided therein with an IC circuit or IC driver. The IC circuit or IC driver may be electrically connected to multiple light emitting devices, and may be covered with a molded layer along with the multiple light emitting devices. Accordingly, the IC circuit or IC driver can be handled along with the multiple light emitting devices and thus can be easily applied to a product. A distance from an upper surface of the IC circuit or IC driver to a light exit surface of the molded layer may be different from a distance from an upper surface of each of the light emitting devices to the light exit surface of the molded layer. However, the molded layer can compensate for this difference, thereby eliminating the need to change the location of the light exit surface.

The light emitting module according to the present invention may have a luminous intensity of 4 cd to 60 cd. Within this range, the light emitting module may be particularly suitable for use in an automotive rear lamp.

In addition, according to the present invention, multiple light emitting modules may be designed to have the same size and to use the same electrode pad (for example, the electrode pad shown in FIG. 8). In this way, a user can freely select and arrange any of the light emitting modules according to various embodiments of the present invention as desired.

The multiple light emitting devices of the light emitting module according to the present invention may be individually controllable.

Figure 17:
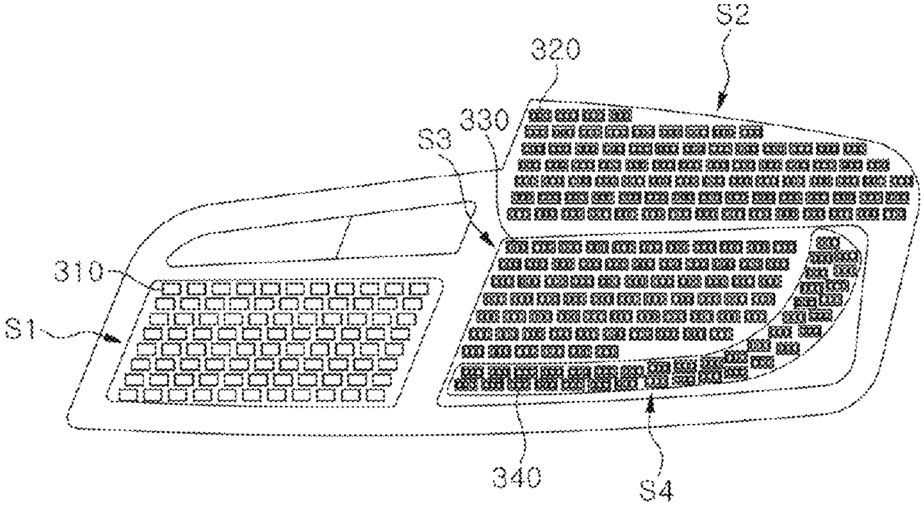
FIG. 17 is a schematic view of a light emitting system according to one embodiment of the present invention.

FIG. 17 is a schematic view of a light emitting system according to one embodiment of the present invention.

Referring to FIG. 17, the light emitting system according to this embodiment includes multiple light emitting modules disposed in different sections. One or more light emitting modules selected from among first to fourth light emitting modules 310, 320, 330, 340 may be disposed in each section S1, S2, S3, or S4.

For example, the first light emitting module 310 may include a light emitting device mounted across the entire plane thereof, as shown in FIG. 5, and the second to fourth light emitting modules 320, 330, 340 may include multiple light emitting devices 510, 520, 530, as shown in FIG. 13 or FIG. 16. In addition, the second light emitting module 320 may include a first light emitting device 510 emitting red series light, a second light emitting device 520 emitting green series light, and a third light emitting device 530 emitting blue series light, the third light emitting module 330 may include a first light emitting device 510 emitting red series light, a second light emitting device 520 emitting yellow series light, and a third light emitting device 530 emitting cyan series light, and the fourth light emitting module 340 may include first to third light emitting devices 510, 520, 530 emitting red series light.

According to the present invention, for different sections S1, S2, S3, or S4, a user can freely select one or more light emitting modules among the first to fourth light emitting modules. For example, the first light-emitting module 310, the second light-emitting module 320, and the third light-emitting module 330 may be disposed in the first section S1, the second section S2, and the third section S3, respectively, as shown in FIG. 17.

Furthermore, two or more different light emitting modules may be disposed together in each section. For example, the first and third light emitting modules 310, 330 and the second and fourth light-emitting modules 320, 340 may be disposed in the first section S1 and the second section S2, respectively.

For example, the light emitting system according to this embodiment may be applied to a display that is turned on when a light emitting module-equipped means is controlled to reduce speed. The first light emitting module 310 may be used when the display is intended to be used for a high-intensity brake light, the second light emitting module 320 may be used when implementation of at least four colors, preferably all colors, is required, the third light emitting module 330 may be used to display information about the type of energy that propels the light emitting module-equipped means (for example, an automobile) or when the display is a product specialized for electric vehicles, and the fourth light emitting module 340 may be used when precise and fine adjustment of red brightness is required.

The system according to the present invention may include a means whose location can change (for example, an automobile), and multiple light emitting modules disposed in each section of the means, wherein one or more of the multiple light emitting modules may be selectively turned on by a user for purpose to be recognized from outside.

The present invention may be applied to a display of a light emitting module-equipped means (for example, an automobile). Particularly, the present invention may be applied to a signal displayed outwardly during supply of electrical energy to the light emitting module-equipped means, a taillight of an automobile, a charging signal of electric vehicles, and the like.

The present invention may be configured to implement a string of characters (letters, numbers, etc.). For example, the first section may implement a first character, the second section may implement a second character, the third segment may implement a third character, and the fourth section may implement a fourth character.

The present invention may be configured to be implemented via a subscription service. For example, the light emitting system may be designed such that, when a user subscribes to a service that provides color, character, and shape options, the user can apply these options to an internal display and/or external display of a light emitting module-equipped means (for example, an automobile). The light emitting system may be designed such that, when a user wants to, for example, change the color of an interior light of their automobiles, or implement a certain string of characters on an external display of their automobiles, this can be accomplished via the subscription service.

The subscription service may be executed via an intermediary such as a website, an application on a smartphone, or the like. For example, the subscription service may be executed through the steps of: 1) selecting, by a user, an option via an intermediary; 2) paying, by the user, charge for the selected option; and 3) providing, by a service supplier, a corresponding service through operation of the light emitting modules. Here, the service supplier may operate the light emitting modules by sending a signal online according to the option selected by the user, or may operate the light emitting modules directly offline.

Although not shown in the drawings, in accordance with a further aspect of the present invention, the light emitting device set forth herein may be used in a module for illuminating plants to help the plants to grow. The module for illuminating plants includes a circuit board and multiple light emitting devices 510, 520, 530 mounted on the circuit board. As the multiple light emitting devices, any of the light emitting devices according to the embodiments described above may be used.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

Therefore, the scope of the invention is not limited to what is recited in the detailed description of the specification, and should be defined by the appended claims.

<List of Reference numerals>

| | |
|---|---|
| 10: Growth substrate | 20: First light-transmissive layer |
| 25: Second light-transmissive layer | 31: First window layer |
| 32: Second window layer | 41: First cladding layer |
| 42: Second cladding layer | 51: First electron control layer |
| 52: First positive hole control layer | 60: Active layer |
| 71: First contact layer | 72: Second contact layer |
| 81: First ohmic electrode | 82: Second ohmic electrode |
| 90: Insulating layer | 95: Opening |
| M: Mesa | 101: First bump |
| 102: Second bump | 150: Electrode pad |
| H: Main portion | F: Finger |
| S1: First section | S2: Second section |
| S3: Third section | S4: Fourth section |
| 310: First light emitting module | 320: Second light emitting module |
| 330: Third light emitting module | 340: Fourth light emitting module |
| 510: First light emitting device | 520: Second light emitting device |
| 530: Third light emitting device | 540: Molded portion |
| 600: Light-reflective layer | 1000: Module substrate |

The invention claimed is:

1. A light emitting system comprising:

a vehicle;

a plurality of light emitting modules disposed in the vehicle; and circuitry disposed in the vehicle and configured to control the plurality of light emitting modules, wherein at least one of the plurality of light emitting modules is configured to be selectively turned on by a user, via the circuitry, so as to be recognized from an outside of the vehicle, wherein at least one of the plurality of light emitting modules includes a light emitting device comprising:

a first window layer configured to supply electrons;

a second window layer configured to supply holes;

an active layer disposed between the first window layer and the second window layer;

a first ohmic electrode electrically connected to the first window layer; and a second ohmic electrode electrically connected to the second window layer, wherein the first window layer includes a first high-level doped layer having a doping level that is higher than doping levels of other portions of the first window layer, and wherein the first ohmic electrode is electrically connected to the first high-level doped layer.

2. The light emitting system according to claim 1, wherein the plurality of light emitting modules include a first light emitting module, and wherein the first light emitting module includes a light emitting device formed across an entire plane of the first light emitting module.

3. The light emitting system according to claim 1, wherein the plurality of light emitting modules include a first light emitting module, and wherein the first light emitting module is used in a display and is configured to turn on in response to the vehicle being controlled to reduce speed.

4. The light emitting system according to claim 1, wherein the plurality of light emitting modules include a first light emitting module, wherein the first light emitting module includes a first light emitting device configured to emit red light, a second light emitting device configured to emit green light, and a third light emitting device configured to emit blue light, and wherein each of the first, second, and third light emitting devices are individually controlled.

5. The light emitting system according to claim 4, wherein the first light emitting module is used in response to the vehicle implementing at least four colors.

6. The light emitting system according to claim 1, wherein the plurality of light emitting modules include a first light emitting module, and wherein the first light emitting module includes a first light emitting device configured to emit red light, a second light emitting device configured to emit yellow light, and a third light emitting device configured to emit cyan light.

7. The light emitting system according to claim 1, wherein the plurality of light emitting modules include a first light emitting module, and wherein the first light emitting module is configured to display information about a form of energy that propels the vehicle.

8. The light emitting system according to claim 1, wherein the plurality of light emitting modules include a first light emitting module, and wherein the first light emitting module includes three light emitting devices configured to emit red light.

9. The light emitting system according to claim 8, wherein a brightness of the red light of the first light emitting module is configured to be adjusted.

10. The light emitting system according to claim 1, wherein the light emitting system is applied to a signal displayed outwardly during supply of electric energy to the vehicle.

11. The light emitting system according to claim 1, wherein the light emitting system is configured to implement a string of characters.

12. The light emitting system according to claim 1, wherein the light emitting system is configured to be implemented via a subscription service.

13. The light emitting system according to claim 12, wherein the subscription service is applied to at least one of an internal display or an external display of the vehicle.

14. The light emitting system according to claim 12, wherein the subscription service includes:

selecting, by a user, an option via an intermediary;

paying, by the user, a charge for the selected option; and providing, by a service supplier, a corresponding service through operation of the plurality of light emitting modules.

* * * * *